(12) United States Patent
Murata et al.

(10) Patent No.: US 10,533,611 B2
(45) Date of Patent: Jan. 14, 2020

(54) ASSEMBLY METHOD FOR CROSS SHAFT UNIVERSAL JOINT

(71) Applicant: NSK LTD., Tokyo (JP)

(72) Inventors: Toshikazu Murata, Kanagawa (JP); Yasutomo Shikanai, Kanagawa (JP)

(73) Assignee: NSK LTD., Tokyo (JP)

( * ) Notice: Subject to any disclaimer, the term of this patent is extended or adjusted under 35 U.S.C. 154(b) by 365 days.

(21) Appl. No.: 15/310,481

(22) PCT Filed: May 13, 2015

(86) PCT No.: PCT/JP2015/063777
§ 371 (c)(1),
(2) Date: Nov. 11, 2016

(87) PCT Pub. No.: WO2015/174457
PCT Pub. Date: Nov. 19, 2015

(65) Prior Publication Data
US 2017/0089397 A1 Mar. 30, 2017

(30) Foreign Application Priority Data

May 14, 2014 (JP) ................................. 2014-100588
May 27, 2014 (JP) ................................. 2014-108839
May 27, 2014 (JP) ................................. 2014-108840

(51) Int. Cl.
*F16C 43/04* (2006.01)
*F16D 3/38* (2006.01)
(Continued)

(52) U.S. Cl.
CPC ............ *F16C 43/04* (2013.01); *F16C 21/005* (2013.01); *F16C 35/067* (2013.01); *F16D 3/382* (2013.01);
(Continued)

(58) Field of Classification Search
CPC ...... F16C 43/04; F16C 21/005; F16C 35/067; F16C 2361/41; F16D 3/387; F16D 3/385; F16D 3/41; F16D 2250/0084
See application file for complete search history.

(56) References Cited

U.S. PATENT DOCUMENTS 4,704,782 A 11/1987 Spiess et al.

FOREIGN PATENT DOCUMENTS

JP 63-210419 A 9/1988
JP 10-159864 A 6/1998
(Continued)

OTHER PUBLICATIONS

Extended European Search Report dated Mar. 15, 2018, from the corresponding EP 15793070.2, pp. 1 through 6.
(Continued)

*Primary Examiner* — John C Hong
(74) *Attorney, Agent, or Firm* — Katten Muchin Rosenman LLP

(57) ABSTRACT

In order to attach cup bearings 18 with good precision in portions between circular holes 15 that are formed in joining-arm sections 10 of yokes 7a, 7b of a cross shaft universal joint 6 and the tip-end sections of a shaft section 17a of a cross shaft 8 regardless of variation in the dimensions of the joining-arm sections 10, the circular holes 15 in the tip-end sections thereof, and the cup bearings 18, and elastic deformation of the joining-arm sections 10 of the yoke 7a during press-fitting work, press-fitting punches 33 are used to pressure fit the cup bearings 18 to a preset reference position inside the circular holes 15, and the value of the pressure that is applied to the press-fitting punches at that instant is set as a reference pressure, and at the instant when the pressure applied to the press-fitting punches becomes larger than the reference pressure by a preset specified value, the cup bearings 18 are determined to have reached positions where press-fitting is complete.

7 Claims, 14 Drawing Sheets

(51) Int. Cl.
*F16D 3/41* (2006.01)
*F16C 35/067* (2006.01)
*F16C 21/00* (2006.01)
*F16D 3/40* (2006.01)

(52) U.S. Cl.
CPC ............ *F16D 3/387* (2013.01); *F16D 3/405* (2013.01); *F16C 2361/41* (2013.01); *F16D 3/385* (2013.01); *F16D 3/41* (2013.01); *F16D 2250/0084* (2013.01); *F16D 2300/12* (2013.01)

(56) References Cited

FOREIGN PATENT DOCUMENTS

| | | |
|---|---|---|
| JP | 10-180576 A | 7/1998 |
| JP | 10-205547 A | 8/1998 |
| JP | 2007-321904 A | 12/2007 |
| JP | 2007-327593 A | 12/2007 |

OTHER PUBLICATIONS

International Search Report dated Aug. 4, 2015, from the corresponding PCT/JP2015/063777.

Reference Position

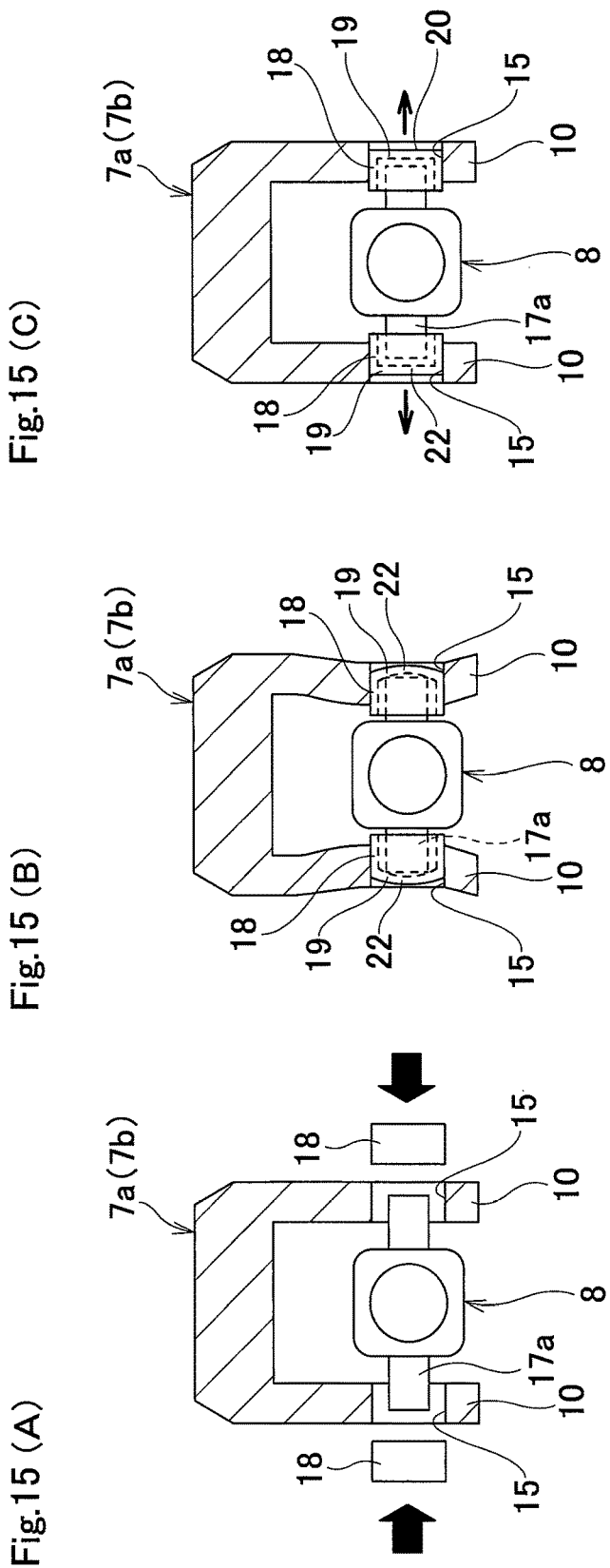

ASSEMBLY METHOD FOR CROSS SHAFT UNIVERSAL JOINT

TECHNICAL FIELD

The present invention relates to an assembly method for a cross shaft universal joint that is assembled, for example, in a steering apparatus for transmitting movement of a steering shaft to a steering gear.

BACKGROUND ART

As illustrated in FIG. 10, a steering apparatus for an automobile is constructed so as to transmit the movement of a steering wheel 1 by way of an steering shaft 2 and an intermediate shaft 3 to a steering gear unit 4 that steers the wheels. The steering shaft 2 and an input shaft 5 of the steering gear unit 4 normally cannot be arranged on the same straight line. Therefore, an intermediate shaft 3 is provided between the steering shaft 2 and the input shaft 5, and both end sections of the intermediate shaft 3 and end sections of the steering shaft 2 and input shaft 5 are joined by way of a cross shaft universal joint 6 that is called a Cardan joint. With this kind of construction, it becomes possible to transmit rotation between the steering shaft 2 and input shaft 5 that are not on the same straight line.

FIG. 11 and FIG. 12 illustrate an example of a conventional cross shaft universal joint as disclosed in JPH10205547 (A). The cross shaft universal joint 6 includes a pair of yokes 7a, 7b that are made of metal plate, and a cross shaft 8. Of the pair of yokes 7a, 7b, one yoke 7a (right yoke in FIG. 11 and FIG. 12) includes a base section 9a, and a pair of joining-arm sections 10 that extend from the edge of one end (edge on the left end in FIG. 11 and FIG. 12) in the axial direction of the base section 9a.

The base section 9a is formed into an incomplete cylindrical shape that is not continuous at one location in the circumferential direction, and the inner diameter of the base section 9a is able to expand or contract in order that the end section of a rotating shaft (not illustrated in the figure) such as a steering shaft can be inserted. Moreover, a pair of flanges 11a, 11b that face each other are provided on the base section 9a so as to sandwich the non-continuous section from both sides in the circumferential direction. A through hole 12 for inserting the rod section of a bolt (not illustrated in the figures) is formed in one of the flanges 11a (lower flange in FIG. 12) of the pair of flanges 11a, 11b. On the other hand, a through hole 13 is formed in the other flange 11b (upper flange in FIG. 12) of the pair of flanges 11a, 11b, and a nut 14 is press-fitted and fastened in the through hole 13, and that nut 14 functions as a screw hole for screwing the bolt into the other flange 11b.

The pair of joining-arm sections 10 extend in the axial direction of the base section 9a from two locations on opposite sides in the radial direction of one end section in the axial direction of the base section 9a, and are such that the inside surfaces face each other. Circular holes 15 that are coaxial with each other are formed in the tip end sections of the pair of joining-arm sections 10.

The other yoke 7b (left yoke in FIG. 11 and FIG. 12) of the pair of yokes 7a, 7b is such that only the shape of the base section 9b differs from the one yoke 7a. The base section 9b of the other yoke 7b is a complete cylindrical shape in order to insert an end section of a rotating shaft 16 such as the intermediate shaft.

The cross shaft 8 is constructed by two shaft sections 17a, 17b that are provided so as to intersect in a cross shape, and of these shaft sections 17a, 17b, both ends of one of the shaft sections 17a are pivotally supported on the inside of a pair of circular holes 15 that are formed in the pair of joining-arm sections 10 of the one yoke 7a, and both end sections of the other shaft section 17b are pivotally supported on the inside of a pair of circular holes 15 that are formed in the pair of joining-arm sections 10 of the other yoke 7b. More specifically, the tip end sections of each of the shaft sections 17a, 17b of the cross shaft 8 are supported on the inside of the circular holes 15 by way of cup bearings 18 so as to rotate freely.

Each of the cup bearings 18 corresponds to a shell type needle bearing and includes one cup 19 that corresponds to a shell type outer ring, and plural needles 20. The cup 19 is formed by processing hard metal plate such as carbon steel plate and case hardened steel plate using plastic working such as deep drawing, and includes a cylindrical section 21, a bottom section 22 and an inward facing flange section 23. The bottom section 22 entirely covers the side of one end in the axial direction of the cylindrical section 21 (outside surface side of the joining-arm section 10 when assembled in a circular hole 15). The inward facing flange section 23 bends and extends inward in the radial direction from the other end section in the axial direction of the cylindrical section 21 (end section of the inside surface side when assembled in the circular hole 15), and the surface that faces the needles 20 is curved in a direction to form a concave surface. Each of the cups 19 is such that when press-fitted inside the circular hole 15, crimped sections 24 are formed by plastically deforming plural locations in the circumferential direction of the edge section of the opening of the circular hole 15 of the outside surface of the joining-arm section 10 inward in the radial direction. With this kind of construction, the cup 19 is prevented from coming out in the outward direction from the circular hole 15. The tip end sections of the shaft sections 17a, 17b of the cross shaft 8 are each inserted into the inside in the radial direction of the needles 20.

When joining the end sections of the two rotating shafts 16, 25 by way of the universal joint 6 that is constructed in this way, first, the end section of the rotating shaft 16 is tightly inserted or press-fitted inside the base section 9b of the other yoke 7b of the pre-assembled universal joint 6, and in this state the base section 9b and the end section of the rotating shaft 16 are welded and fastened together. Next, the end section of another rotating shaft 25 is fitted inside the base section 9a of the one yoke 7a of the universal joint 6 with a spline fit, and in this state, the tip end section of a bolt (not illustrated in the figures), the rod section of which has been inserted through the through hole 12 that is formed in the one flange 11a, is screwed into the nut 14 that was fastened to the other flange 11b and tightened. As a result, by causing the base section 9a to contract by reducing the space between the pair of flanges 11a, 11b, the end section of the other rotating shaft 25 is joined and fastened to the base section 9a.

The universal joint 6 is assembled by joining the pair of yokes 7a, 7b by way of the cross shaft 8. FIG. 13A and FIG. 13B illustrate an example of a conventional method for assembling the universal joint 6. When doing this, a yoke clamping jig 26 is used for supporting the pair of yokes 7a, 7b. The yoke clamping jig 26 includes a pair of L-shaped supporting-arm sections 27 and a motor (not illustrated in the figures) for moving the supporting-arm sections 27. In order to attach the shaft sections 17a, 17b of the cross shaft 8 to the pair of yokes 7a, 7b, press-fitting punches 28 and crimping punches 29 are used. The press-fitting punches 28 are formed into a circular column shape, and are able to move in the forward-backward direction (left-right direction in FIG. 13A and FIG. 13B) by press-fitting cylinders (not illustrated in the figures) that are provided on the base-end sides. On the other hand, the crimping punches 29 are formed into a cylindrical shape, and fit around the press-fitting punches 28. The crimping punches 29 are able to move in the forward-backward direction (left-right direction in FIG. 13A and FIG. 13B) by crimping cylinders (not illustrated in the figures) that are provided on the base-end sides.

When assembling the universal joint 6, first, both end sections of the one shaft section 17a of the cross shaft 8 are gently inserted inside the pair of circular holes 15 of the one yoke 7a, and in this state, the tip-end sections of the pair of supporting-arm sections 27 of the yoke clamping jig 26 are arranged inside the pair of joining-arm sections 10. Moreover, the press-fitting punches 28 and crimping punches 29 are arranged in positions on both sides sandwiching the pair of joining-arm sections 10 so that each is coaxial with the center axis of the circular holes 15. Next, by driving the motor of the yoke clamping jig 26, the pair of supporting-arm sections 27 are synchronously moved in directions going away from each other in the direction of the center axis of the circular holes 15. Then, the outside surfaces of the tip-end sections of the pair of supporting arm sections 27 are brought in contact with the inside surfaces of the tip end sections of the pair of joining-arm sections 10, and support the pair of joining-arm sections 10.

Furthermore, by moving each press-fitting punch 28 in the forward direction (direction toward the yoke 7a), the inside surfaces of the bottom sections 22 of the cups 19 of the cup bearings 18 are pressed against the tip-end surfaces of the shaft section 17a, and at the instant that the pressure applied to the press-fitting punches 28 reaches a specified size, or at the instant that the amount that the press-fitting punches 28 have moved in the forward direction has reached a specified amount, movement in the forward direction stops. Next, the crimping punches 29 are moved in the forward direction, plastically deform plural locations in the circumferential direction of the edge sections of the openings of the circular holes 15 of the outside surface of the joining-arm sections 10, and form crimped sections 24 in those portions. As a result, the cup bearings 18 are attached to portions between the circular holes 15 and both end sections of the shaft section 17a, and both end sections of the shaft section 17a are supported on the inside of the circular holes 15 by way of the cup bearings 18. Attaching the other yoke 7b and the shaft section 17b of the cross shaft 8 is performed in the same way.

RELATED LITERATURE

Patent Literature

[Patent Literature 1] JPH10205547 (A)

SUMMARY OF INVENTION

Problems to be Solved by Invention

In the assembly method for a conventional cross shaft universal joint, the press-fitting amount (press-fit position) of the cup bearings 18 is determined based only on the size of the pressure that is applied to the press-fitting punches 28, or based only on the amount of movement in the forward direction of the press-fitting punches 28. When the press-fitting amount of the cup bearings 18 is determined in this way, there is a possibility that it will be difficult to stably apply a proper preload to the cup bearings 18 of the cross shaft universal joint 6, and it may not be possible to sufficiently prevent the cup bearings 18 from coming out.

For example, normally variation within the dimensional tolerance occurs in the dimensions of the members of the universal joint 6, such as the inner-diameter dimension of a circular hole 15 that is formed in a yoke 7a (7b), outer-diameter dimension of a cup bearing 18, dimension in the axial direction of a shaft section 17a (17b) of the cross shaft 8 and the like. Therefore, when assembling plural universal joints 6, there are cases for example, when a yoke 7a (7b) having a circular hole 15 that has large inner-diameter dimension will be combined with a cup bearing 18 having a small outer-diameter dimension, or conversely, a yoke 7a (7b) having a circular hole 15 that has small inner-diameter dimension will be combined with a cup bearing 18 having a large outer-diameter dimension. Therefore, when the press-fitting amount of a cup bearing 18 is determined based only on the size of the pressure applied to the press-fitting punch 28, there is a possibility that the press-fitting amount of the cup bearing 18 will become excessively large or will not be sufficient, and it will become difficult to stably apply a proper preload to the cup bearing 18.

Moreover, normally variation within the dimensional tolerance will also occur in the dimension from the center axis X of a yoke 7a (7b) to the inside surfaces of the pair of joining-arm sections 10 (hereafter, this is called the inside-surface dimension). Therefore, as illustrated in FIG. 14A, when the pair of supporting arm sections 27 are moved from the center position (machine center position) O in the center axis direction of the circular holes 15 of the pair of joining-arm sections 10 by equal amounts in directions going away from each other, the yoke 7a (7b) is shifted in the center axis direction of the circular hole (left-right direction in FIG. 14A) due to variation in the inside surface dimensions of the pair of joining-arm sections 10. More specifically, as illustrated in FIG. 14A, in a state in which the center axis X of the yoke 7a (7b) coincides with the machine center position O of the pair of supporting-arm sections 27, when the distance (L1) from the outside surface of the tip-end section of one of the supporting arm sections 27 (right supporting-arm section in FIG. 14A) of the pair of supporting arm sections 27 to the inside surface of the tip-end section of one joining-arm section 10 of the pair of joining-arm sections is not the same as the distance (L2) from the outside surface of the tip-end section of the other supporting-arm section 27 (left supporting-arm section in FIG. 14A) to the inside surface of the tip-end section of the other joining-arm section 10 (L1<L2), then as illustrated in FIG. 14B, the yoke 7a (7b) is pressed by the supporting-arm section 27 on the side having a short distance (side where the supporting-arm section 27 and the joining-arm section 10 come in contact first) and shifts to one side in the center axis direction of the center hole 15 (right side in FIG. 14A). Therefore, as illustrated in FIG. 14B, the center axis X of the yoke 7a (7b) in the supported state is shifted an amount ΔA with respect to the machine center position O of the pair of supporting arm sections 27.

When determining the press-fitting amount of the cup bearings 18 based only on the amount of movement in the forward direction of the pair of press-fitting punches 28, the amount of movement in the forward direction of the pair of press-fitting punches 28 is set with the machine center position O as a reference, and the press-fitting amount by one of the press-fitting punches 28 of the pair of press-fitting punches 28 (right press-fitting punch in FIG. 14B) becomes excessive, and the press-fitting amount by the other press-fitting punch 28 (left press-fitting punch in FIG. 14B) is insufficient. Therefore, it becomes difficult to stably apply a proper preload to the pair of cup bearings 18. Moreover, the crimping amount by one crimping punch 29 (right crimping punch in FIG. 14B) of the pair of crimping punches 29 becomes excessive, and the crimping amount by the other crimping punch 29 (left crimping punch in FIG. 14B) is insufficient. Therefore, there is a possibility that it will not be possible to sufficiently prevent at least one of the cup bearings 18 from becoming loose.

Furthermore, there is a possibility that due to the shape and material of the yoke 7a (7b), the pair of joining-arm sections 10 of the yoke 7a (7b) will bend and deform in a direction in which portions surrounding the circular holes 15 move toward each other during the work of press-fitting the cup bearings 18 regardless of backup by the pair of supporting-arm sections 27. Therefore, as illustrated in FIG. 15A, when simultaneously press-fitting the pair of cup bearings 18 in the circular holes 15 that are formed in the pair joining-arm sections 10, the pair of joining-arm sections 10 bend and deform as exaggeratedly illustrated in FIG. 15B. Consequently, when determining the press-fitting amount of the cup bearings 18 based only on the size of the pressure that is applied to the press-fitting punches 28, in a state in which the pair of joining-arm sections 10 have bent and deformed, there is a possibility that the size of the pressure applied to the pair of press-fitting punches 28 will reach a specified value, which is the completed position for press-fitting the pair of cup bearings 18. Incidentally, when the pair of cup bearings 18 are assembled in the state in which the pair of joining-arm sections 10 have bent and deformed, a spring back movement in which the bending deformation of the pair of joining-arm sections 10 is released occurs as illustrated in FIG. 15C as the pair of press-fitting punches 28 are moved back. Due to this, there is a possibility that the inside surfaces of the bottom sections 22 of the cups 19 of the pair of cup bearings 18 will move in a direction going away from the tip end surfaces of the shaft section 17a of the cross shaft 8 by an amount equal to the total amount of bending deformation of the pair of joining-arm sections 10, and spaces will occur between the inside surfaces of the bottom sections 22 and the tip-end surfaces of the shaft section 17a. As a result, it becomes difficult to apply proper preloading to the cup bearings 18.

Taking the above situation into consideration, the object of the present invention is to provide a method for assembling a cross shaft universal joint that makes it possible to attach cup bearings with good precision in the portions between the circular holes that are formed in the joining-arm sections of the yokes and tip end sections of the shaft sections of the cross shaft regardless of variations in the dimensions of the members of the cross shaft universal joint, and elastic deformation of the joining-arm sections of the yokes during the work of press-fitting the cup bearings.

Means for Solving Problems

The present invention is an assembly method for a cross shaft universal joint that includes: a yoke that has a pair of joining-arm sections, and a pair of circular holes that are formed in the tip-end sections of the pair of joining-arm sections; a cross shaft that has a shaft section; and a pair of cup bearings for supporting both end sections of the shaft section on the inside of the pair of circular holes so as to rotate freely; and in order to assemble the pair of cup bearings in portions between the pair of circular holes of the pair of joining arm sections and both end sections of the shaft section that is inserted inside the pair of circular holes from the inside-surface sides of the pair of joining-arm sections, relates to a method of press-fitting the cup bearings inside the pair of circular holes from the outside-surface sides of the pair of joining-arm sections using a pair of press-fitting punches.

The assembly method for a cross shaft universal joint of the present invention basically includes: a step for backing up the pair of joining-arm sections so that the space between the inside surfaces of the tip-end sections of the pair of joining-arm sections can be kept constant; and a step of press-fitting the cup bearings in portions between the pair of circular holes of the pair of joining-arm sections and both end sections of the shaft section that is inserted inside the pair of circular holes from the inside-surface sides of the pair of joining-arm sections using a pair of press-fitting punches in a state in which the pair of joining-arm sections are backed up.

Particularly, the assembly method for a cross shaft universal joint of the present invention has a step of adjusting the amount of movement of the pair of press-fitting punches according to the dimensions of the yoke or cross shaft, or according to the size of elastic deformation of the pair of joining-arm sections during the press-fitting work of the pair of cup bearings inside the pair of circular holes.

In a first embodiment of the present invention, in a state of the pair of joining-arm sections being backed up, and the shaft section being inserted into the pair of circular holes from the inside-surface sides of the pair of joining-arm sections, one of the pair of cup bearings is press-fitted to a preset reference position on the inside of one of the pair of circular holes, and at that instant, the value of the pressure that is applied to one of the pair of press-fitting punches is set as a reference pressure. The one of the pair of cup bearings is then further press-fitted from the reference position, and at the instant that the pressure applied to the one press-fitting punch becomes larger than the reference pressure by a preset value, the one of the pair of cup bearings is determined to have reached a position where press-fitting is complete, and the work of press-fitting the one of the pair of cup bearings ends.

In this case, the one of the pair of cup bearings can include: a cylindrical shaped cup (shell type outer ring, or shell cup) with a bottom that has a cylindrical section and a bottom section that covers one end side of the cylindrical section; and plural needles that are arranged on the inside of the cup so as to roll freely. A position in front of the position where the inner surface of the bottom section of the cup comes in contact with the tip-end surface of one of both end sections of the shaft section is set as the reference position.

As long as the reference position is a position in front of the position where the bottom section of the one of the pair of cup bearings comes in contact with one of both end sections of the shaft section, at least the position at the beginning of press-fitting where the amount of press-fitting of the one of the pair of cup bearings is small can be set as the reference position. However, from the aspect of reducing the cycle time of the press-fitting work, preferably a position near to the position where the bottom section comes in contact with one of both end sections and is about 0.1 mm to 1.0 mm in front of the contact position is set as the reference position. Moreover, for the value of the pressure for determining the position where press-fitting is complete, it is possible to find a proper value beforehand by performing various kinds of simulation and testing based on the material, size, shape and the like of the yoke and cup bearing.

Preferably, the press-fitting speed of the one of the pair of cup bearings after the one of the pair of cup bearings has reached the reference position can be slowed to correspond to the amount of increase in the pressure applied to the one of the pair of press-fitting punches from the reference pressure. In that case, preferably the press-fitting speed of the one of the pair of cup bearings can be further slowed continuously or in stages.

The pressure that is applied to the one of the pair of press-fitting punches can be measured using a pressure sensor that is placed in that one of the pair of press-fitting punches.

The other of the pair of cup bearings can also be assembled by being press-fitted inside the other of the pair of circular holes. Furthermore, both of the pair of cup bearings can be assembled by being simultaneously press-fitted into the pair of circular holes.

In a second embodiment of the present invention, in a state of the pair of joining-arm sections being backed up, and the shaft section being inserted into the pair of circular holes from the inside-surface sides of the pair of joining-arm sections, one of the pair of cup bearings is press-fitted to a preset position where press-fitting is complete using one of the pair of press-fitting punches based on a feed amount of the one of the pair of press-fitting punches, then the one of the pair of press-fitting punches is moved back and the other of the pair cup bearings is press-fitted to a preset reference position using the other of the pair of press-fitting punches based on a feed amount of the other of the pair of press-fitting punches; the other of the pair of cup bearings is then pressed together with the shaft section of the cross shaft using the other of the pair of press-fitting punches, and the position where the size of the pressure that is applied to the other of the pair of press-fitting punches becomes a specified size is determined to be the position where press-fitting is complete, then press-fitting of the other of the pair of cup bearings is stopped and the other of the pair of press-fitting punches is moved back.

In this case, when press-fitting the one of the pair of cup bearings to the position where press-fitting is complete, in a state of the other of the pair of cup bearings being press-fitted to a preset reference position based on a feed amount of the other of the pair of press-fitting punches, and the other of the pair of cup bearings being stopped at the reference position, it is also possible to press-fit only the one of the pair of cup bearings to the position where press-fitting is complete.

In this second embodiment of the present invention, preferably, the value of the pressure that is applied to the other of the pair of press-fitting punches at the instant when the other of the pair of cup bearings has been press-fitted to the reference position is set as a reference pressure. Then, at the instant when the other of the pair of cup bearings is further press-fitted from the reference position and the pressure that is applied to the other of the pair of press-fitting punches becomes larger than the reference pressure by a preset value, it is determined that the other of the cup bearings has reached the position where press-fitting is complete.

Alternatively, when further pressing the other of the pair of cup bearings together with the shaft section of the cross shaft from the reference position, the pressure that is applied to the other of the pair of press-fitting punches can be monitored, and when an inflection point where the tip-end surface of the other of both end sections of the shaft section begins to come in contact with the inner surface of the bottom section of the other of the pair of cup bearings is detected, the value of the pressure at that inflection point can be set as the reference pressure.

The value of the pressure that is applied to the other of the pair of press-fitting punches can be measured using a pressure sensor that is placed in the other of the pair of press-fitting punches. Moreover, for the value of the pressure for determining the position where press-fitting is complete for the other of the pair of press-fitting punches, it is possible to find a proper value beforehand by performing various kinds of simulation and testing based on the material, size, shape and the like of the yoke and cup bearing.

In this second embodiment of the present invention as well, each of the pair of cup bearings can include: a cup (shell type outer ring, or shell cup) that has a cylindrical section and a bottom section that covers one end side of the cylindrical section; and plural needles that are arranged on the inside of the cup so as to roll freely. Moreover, alternatively, for the other of the pair of cup bearings, a position in front of the position where the inner surface of the bottom section of the cup comes in contact with the tip-end surface of the shaft section can be set as the reference position, and the value of the pressure that is applied to the other of the pair of press-fitting punches at that instant can also be set as the reference pressure. The reference position is preferably a position that is in front of the contact position by a small amount of 0.1 mm to 1.0 mm. Furthermore, the press-fitting speed of the other cup bearing after having reached the reference position is preferably slowed continuously or in stages according the amount that the pressure applied to the other press-fitting punch is increased from the reference pressure.

In a third embodiment of the present invention, when the inside surfaces of the tip-end sections of the pair of joining-arm sections are backed up by a pair of supporting members that move by being driven by servo motors, the pair of supporting members are moved by being driven by the servo motors in directions parallel to the center axis of the pair of circular holes and in directions away from each other so that the pair of supporting member approach the inside surfaces of the tip-end sections of the pair of joining-arm sections, and at the instant when specified torques occur in the servo motors, the movement of the pair of supporting members is stopped and the inside surfaces of the tip-end sections of the pair of joining-arm sections are supported by the pair of supporting members; next, the amounts of shifting from the center position (machine center position) in the direction of the center axis of the circular holes of the pair of supporting members to the center position (center position of the pair of joining-arm sections) in the direction of the center axis of the circular holes of the pair of supporting members in a state in which the pair of joining-arm sections are supported are found by using the number of pulses of the servo motors; and when press-fitting the pair of cup bearings using the pair of press-fitting punches, the amounts of movement in the forward direction of the pair of press-fitting punches are respectively corrected based on the amounts of shifting.

In this third embodiment of the present invention, there can also be a further step of using a pair of crimping punches to plastically deform the edge sections of the openings of the pair of circular holes of the outside surfaces of the pair of joining-arm sections after press-fitting the pair of cup bearings into the circular holes using the pair of press-fitting punches; wherein when plastically deforming the edge sections of the openings of the pair of circular holes as well, the amounts of feeding the pair of crimping punches in the forward direction are respectively corrected based on the amount of shifting.

Effect of Invention

With the assembly method for a cross shaft universal joint of the present invention, regardless of variation in the dimensions of each of the members (particularly, the yokes or cross shaft) of the cross shaft universal joint, and regardless of elastic deformation of the pair of joining arm sections of the yokes during the work of press-fitting the pair of cup bearings, it is possible to attach the cup bearings with good precision in portions between the pair of circular holes that are formed in the pair of joining-arm sections and both end sections of the shaft sections of the cross shaft.

BRIEF EXPLANATION OF DRAWINGS

FIG. 15A to FIG. 15C are partial cross-sectional views for explaining problems that occur in a conventional assembly method for a cross shaft universal joint due to elastic deformation of the joining-arm sections during press-fitting of the bearing cups.

MODES FOR CARRYING OUT INVENTION

[Example of First Embodiment]

Figure 1A:
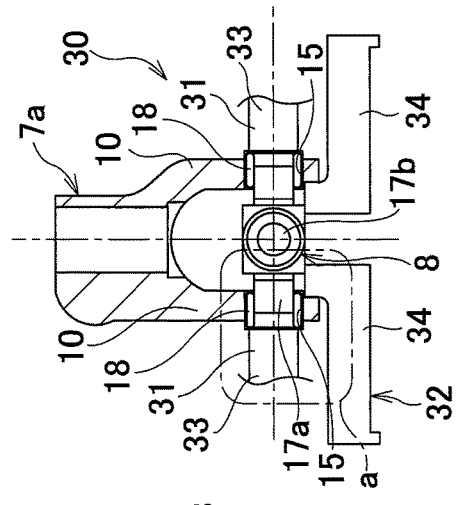
FIG. 1A to FIG. 1F are partial cross-sectional views illustrating the order of processes of the assembly method for a cross shaft universal joint of an example of a first embodiment of the present invention.

FIG. 1A to FIG. 4A illustrate an example of a first embodiment of the present invention. The cross shaft universal joint of this example is the same as a conventional cross shaft universal joint and includes: a yoke 7a that includes a pair of joining-arm sections 10, and a pair of circular holes 15 that are formed in the tip-end sections of the pair of joining-arm sections 10; a cross shaft 8 that includes shaft sections 17a, 17b, and a pair of cup bearings 18 for supporting both end sections of the cross shaft 8 so as to rotate freely inside the pair of circular holes 15. The assembly method for the cross shaft universal joint of this example is also similar to the conventional method in that the method includes at least: a step of backing up the pair of joining-arm sections 10 so that the space between the inside surfaces of the tip-end sections of the pair of joining-arm sections 10 can be kept constant; and a step of press-fitting, with the pair of joining-arm sections 10 backed up, using a pair of press-fitting punches 33, a pair of cup bearings 18 into a portion between the pair of circular holes 15 in the pair of joining-arm sections 10 and both end sections of the shaft sections 17a, 17b, which are inserted into the inside of the pair of circular holes 15 from the inside-surface sides of the pair of joining-arm sections 10, from the outside-surface sides of the pair of joining-arm sections 10.

Figure 10:
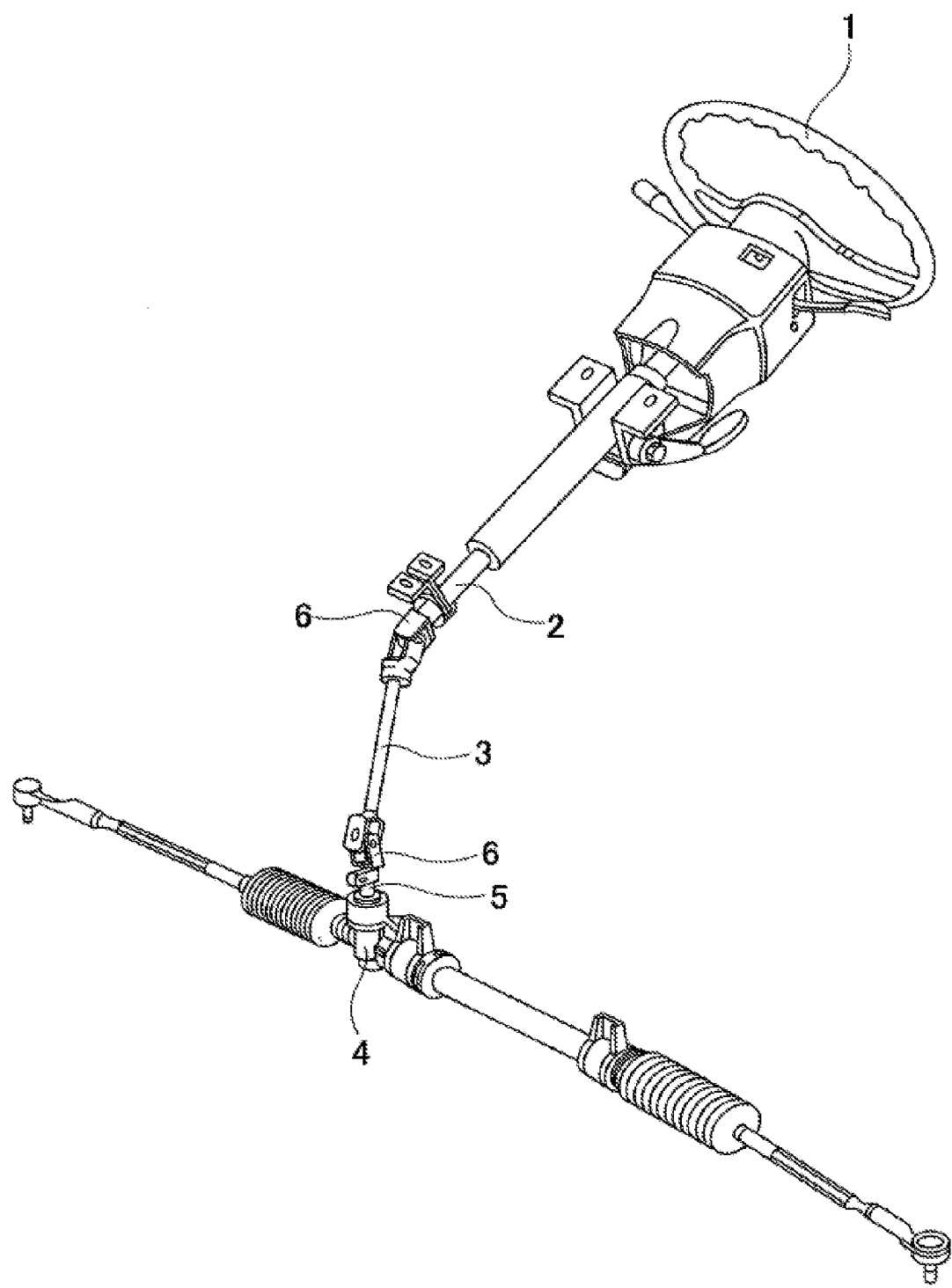
FIG. 10 is a perspective view illustrating an example of a steering apparatus in which a cross shaft universal joint is assembled.
Figure 11:
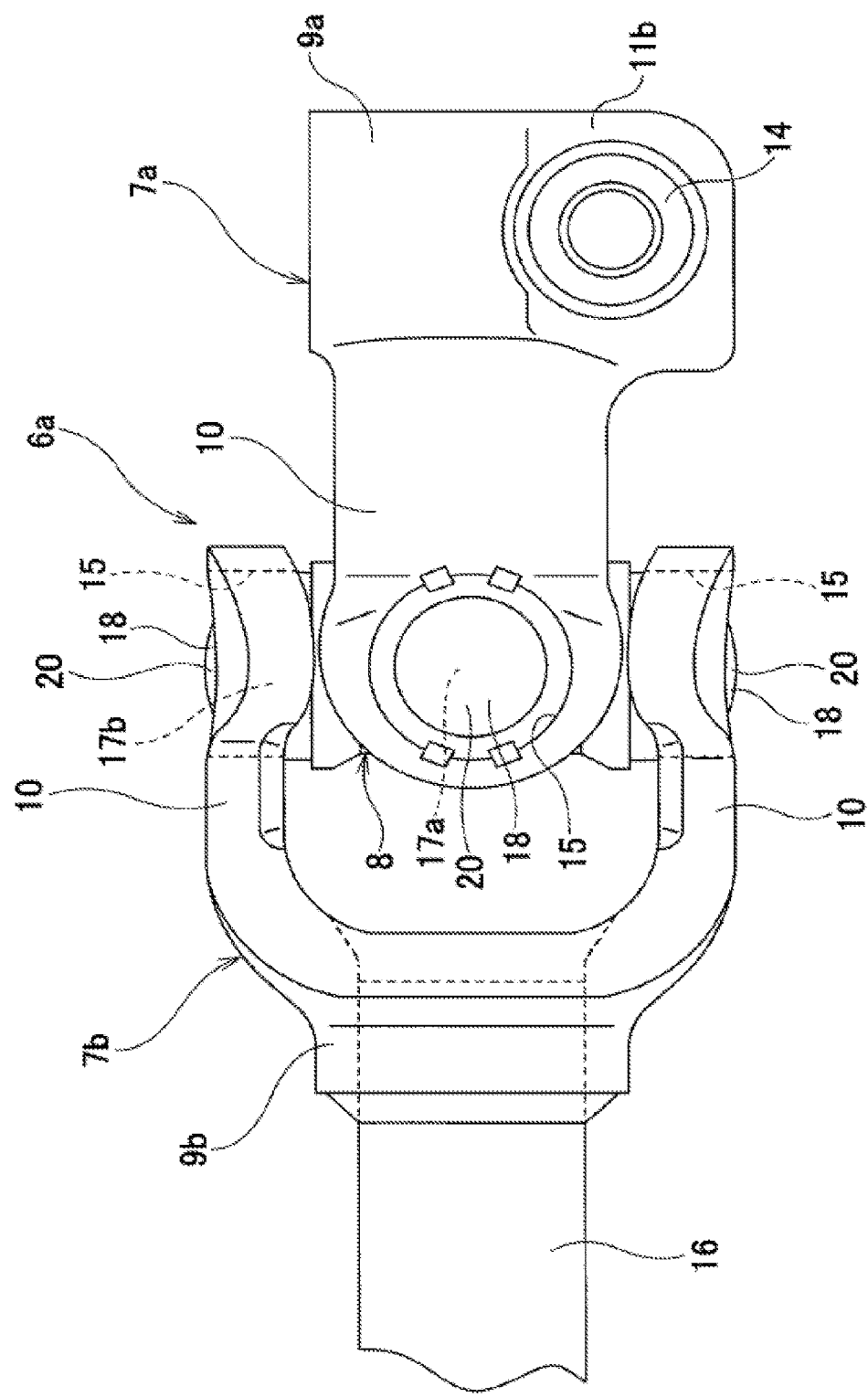
FIG. 11 is a side view illustrating an example of a conventional cross shaft universal joint.
Figure 12:
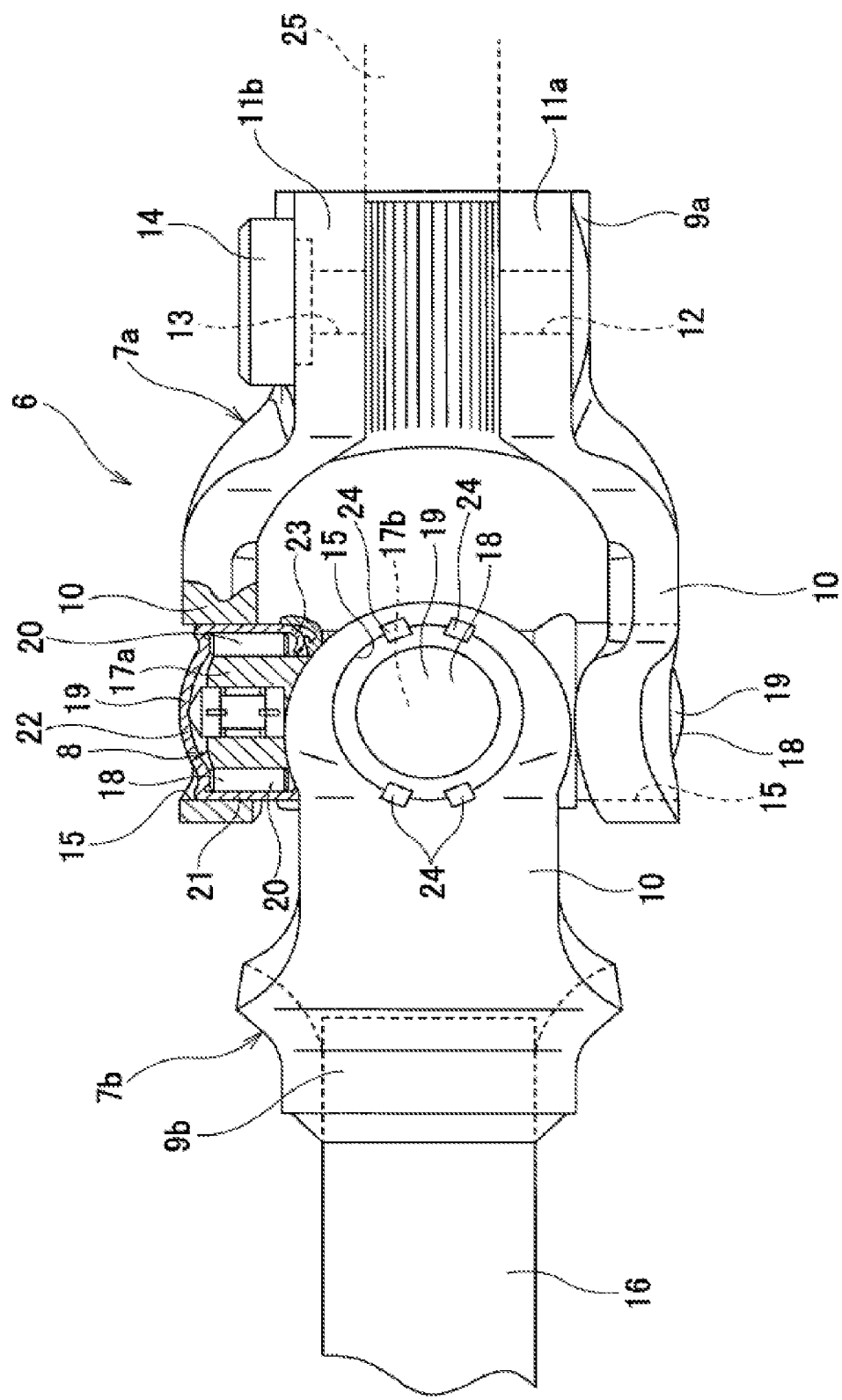
FIG. 12 is a view as seen from below in FIG. 11, and illustrates a state in which part is cut away.
Figure 13:
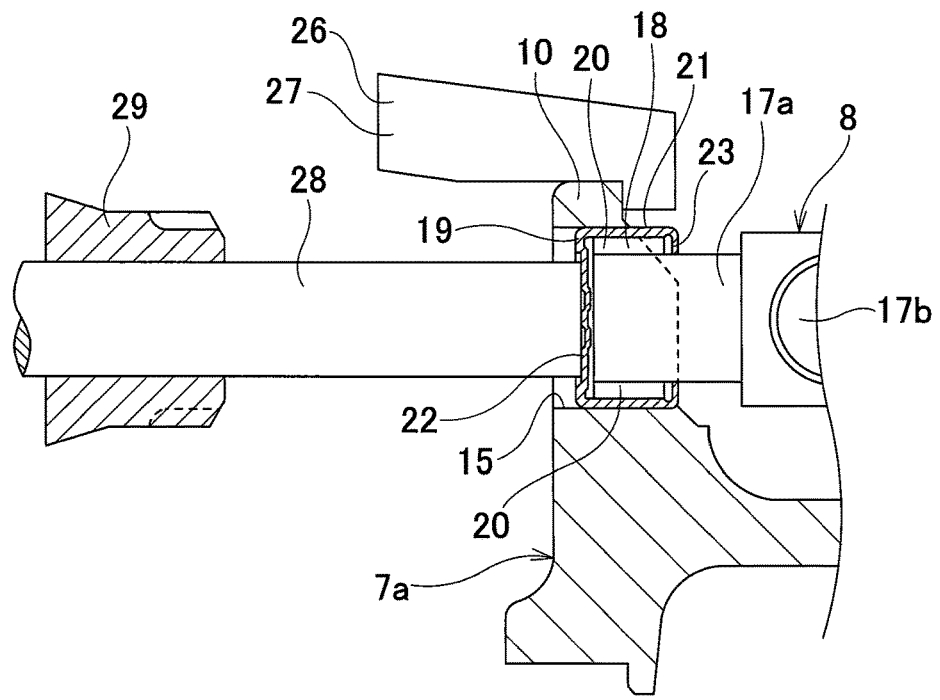
FIG. 13A is a cross-sectional view illustrating the press-fitting process.
FIG. 13B is a cross-sectional view illustrating the crimping process of a conventional assembly method for a cross shaft universal joint.
Figure 13:
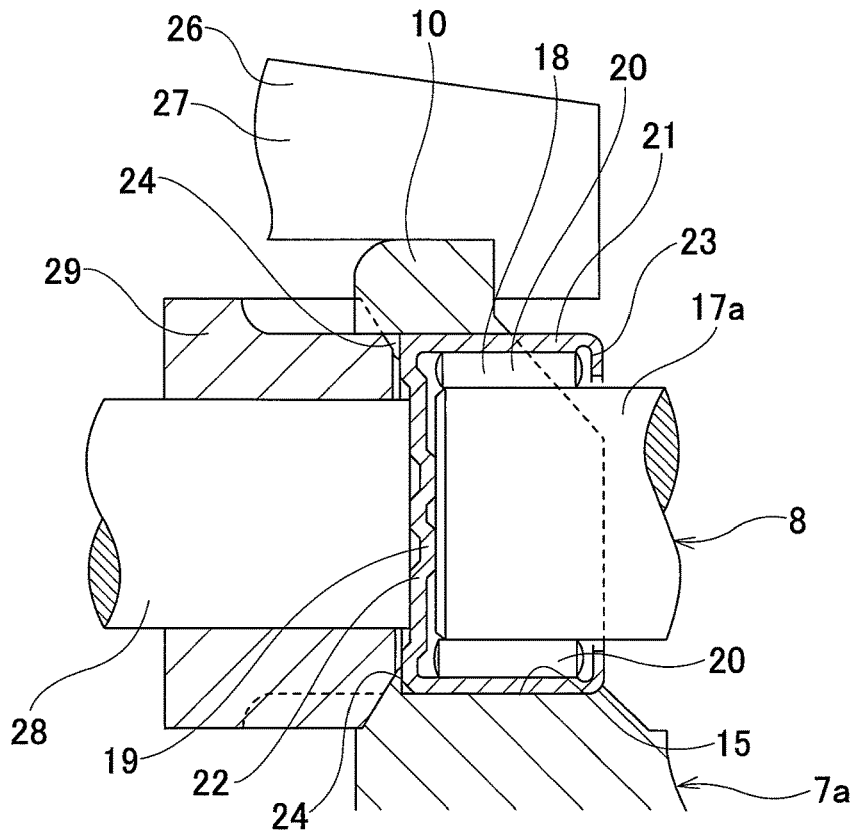
Figure 14:
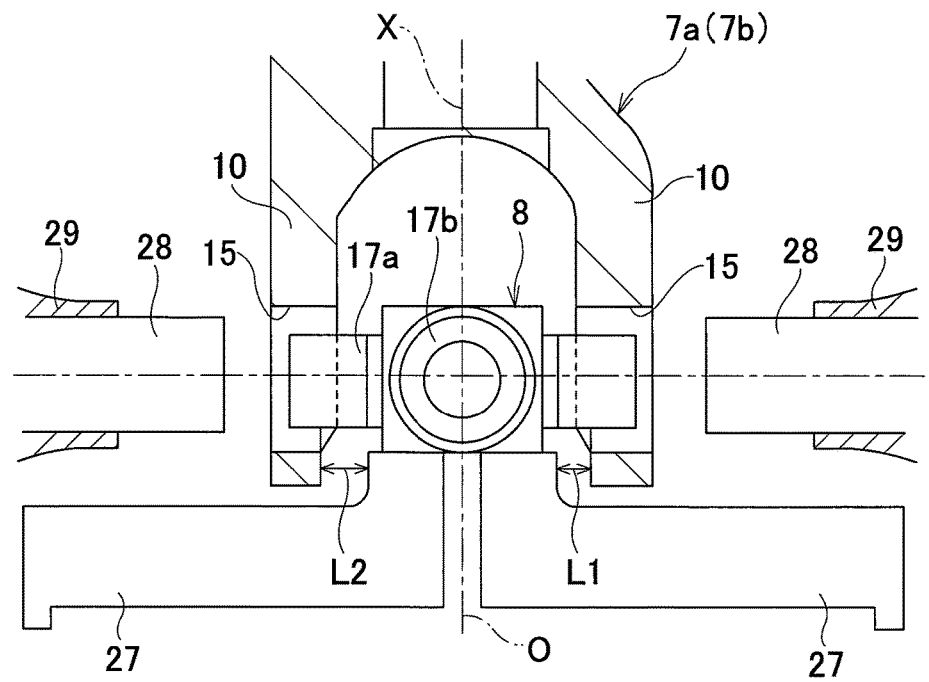
FIG. 14A and FIG. 14B are partial cross-sectional views for explaining problems that occur in a conventional assembly method for a cross shaft universal joint due to variation in the dimension of the members of the universal joint.
Figure 14:
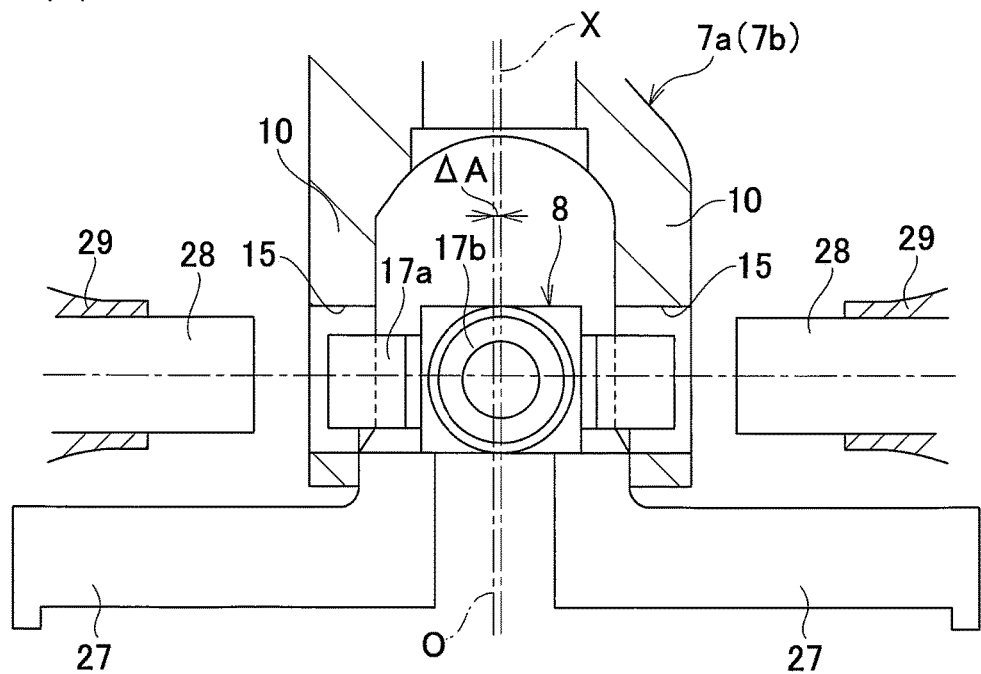

A feature of this example is that by devising the press-fitting process for the cup bearings 18, it is possible to attach the cup bearings 18 with good precision regardless of variation in the dimensions of each of the members of the cross shaft universal joint 6 (refer to FIG. 10 to FIG. 12). The other construction of the universal joint 6, the configuration of the assembly method and the effects of these are the same as in the conventional example.

The assembly method for the universal joint 6 of this example mainly includes six processes. These processes will be explained below in the order of the processes. In the assembly method for the universal joint 6 of this example, as in the conventional method, an assembly apparatus 30 that includes a pair of press-fitting/crimping devices 31, and a yoke-clamping jig 32 is mainly used. Each of the pair of press-fitting/crimping devices 31 includes a circular column-shaped press-fitting punch 33, a cylindrical-shaped crimping punch 35 that fits around the press-fitting punch 33 so that relative movement is possible, and driving mechanisms such as servo motors, cylinders or the like that are provided on the base-end sides of the press-fitting punch 33 and the crimping punch 35, and that separately move the press-fitting punch 33 and the crimping punch 35. Moreover, the yoke-clamping jig 32 includes a pair of L-shaped supporting-arm sections 34, and driving mechanisms such as servo motors (not illustrated in the figures) for moving each of the pair of supporting-arm sections 34. The assembly apparatus 30, in order to measure the feed amounts of the press-fitting punch 33 and crimping punch 35, also includes linear scales or devices that measure the amount of pulses of the driving mechanisms, and any known device can be used for these; and since these do not directly effect the scope of the present invention, these devices are omitted in the figures.

[(A) Pre-Setup Process]

As illustrated in FIG. 1A, both end sections of the one of the shaft sections 17a of the cross shaft 8 are inserted and pre-assembled inside the circular holes 15 that are formed in the pair of joining-arm sections 10 of the yoke 7a, and in this state, the yoke 7a is held by a chuck (not illustrated in the figures) in a position above the yoke-clamping jig 32, facing downward. More specifically, the center position O (machine center position) in the center axis direction of the circular holes 15 of the pair of supporting-arm sections 34 of the yoke-clamping jig 32, which are supporting members for the pair of joining-arm sections 10, is made to coincide with the center axis X of the yoke 7a, and in this state, the yoke 7a is located at a position above the yoke-clamping jig 32. Moreover, using a centering jig (not illustrated in the figures), both end sections of one shaft section 17a are positioned on the same axis as the center axes of the pair of circular holes 15 of the pair of joining-arm sections 10.

[(B) Backup Process]

Figure 1B:
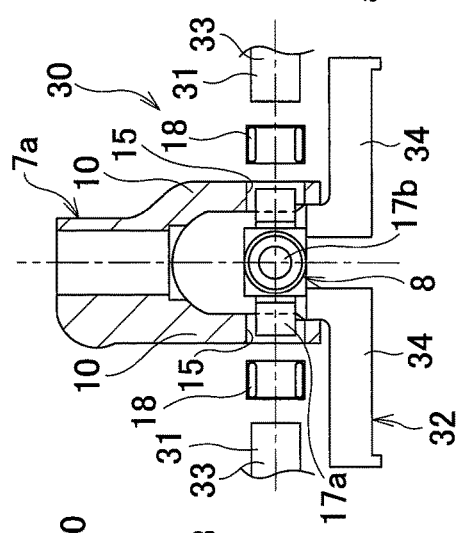

Next, as illustrated in FIG. 1B, the yoke 7a is lowered just a specified amount, and the center holes 15 of the pair of joining-arm sections 10 and the pair of press-fitting punches 33 of the pair of press-fitting/crimping devices 31 are positioned on the same axis. Moreover, in this state, the tip-end sections of the pair of supporting-arm sections 34 of the yoke-clamping jig 32 are inserted between the inside surfaces of the tip-end sections of the pair of joining-arm sections 10. Next, by driving the servo motor of the yoke-clamping jig 32, the pair of supporting-arm sections 34 are driven in directions away from each other (left and right directions in FIG. 1B, and the outside surfaces of the tip-end sections of the pair of supporting-arm sections 34 are brought into contact with the inside surface of the tip-end sections of the pair of joining-arm sections 10. Then, using pressure sensors that are located on each of the pair of supporting-arm sections 34, the size of the pressure applied to the pair of supporting-arm sections 34 is measured, and the pair of joining-arm sections 10 are expanded until the pressure applied to the pair of supporting-arm sections 34 reaches a specified value. As a result, the space between the inside surfaces of the tip-end sections of the pair of joining-arm sections 10 is kept constant, and in this state, the pair of joining-arm sections 10 are backed up. Next, using a bearing-supply device (not illustrated in the figures), a pair of cup bearings 18 are supplied on the same axis as the circular holes 15 and the press-fitting punches 33. However, the pair of cup bearings 18 could also be supplied in the stage of the pre-setup process illustrated in FIG. 1A.

[(C) High-Speed Press-Fitting Process]

Figure 1C:
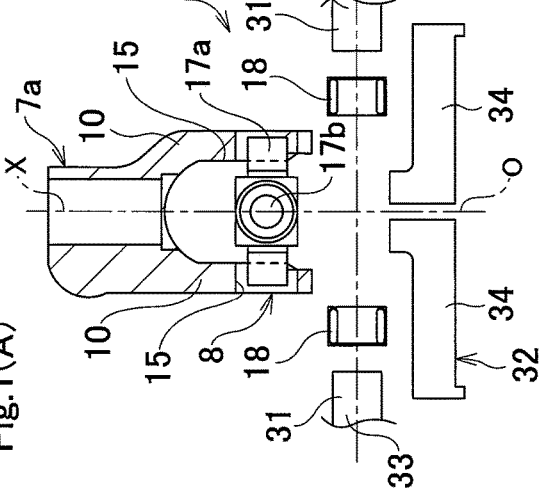

In this example, a feature of the press-fitting process for the cup bearings 18 is that the process is performed in two stages: a high-speed press-fitting process, and an intermediate-speed and low-speed press-fitting process. First, as illustrated in FIG. 1C, in a state in which the pair of joining-arm sections 10 are backed up and one of the shaft sections 17a is inserted into the pair of circular holes 15 from the inside-surface sides of the pair of joining-arm sections 10, by driving the servo motors of the pair of press-fitting/crimping devices 31, or by driving the cylinders that operate by hydraulic pressure or pneumatic pressure, the pair of press-fitting punches 33 are moved in the forward direction (direction toward each other), and the pair of cup bearings 18 are simultaneously press-fitted into the circular holes 15 from the outside-surface sides of the pair of joining-arm sections 10. In this example, the size of the pressure (pressure reaction force) that is applied to the pair of press-fitting punches 33 is measured by pressure sensors that are arranged in each of the pair of press-fitting punches 33, and the feed amount (press-fitting amount of the cup bearings 18) of the pair of press-fitting punches 33 with respect to the machine center position O is measured by the number of feed pulses of linear scales or servo motors. As a result, positions that are a small amount of about 0.1 mm to 1.0 mm, and preferably 0.3 mm to 0.7 mm in front of the positions where the inside surfaces of the bottom sections 22 of the cups 19 of the pair of cup bearings 18 come in contact with the tips-end surfaces of both end sections of the shaft section 17a are set as reference positions, and the pair of cup bearings 18 are press-fitted at high speed (speed of 50 mm/sec to 100 mm/sec) by the pair of press-fitting punches 33 until the pair of cup bearings 18 reach the reference positions.

In other words, the pair of press-fitting punches 33 are moved in the forward direction until the space between the tip-end surfaces of the pair of press-fitting punches 33 is the same as the total value of the dimension in the axial direction of the shaft section 17a (including tolerances), two times the value of the space between the inside surfaces of the bottom section 22 and the tip-end surface of the shaft section 17a (about 0.1 mm to 1.0 mm), and two times the value of the thickness dimension of the bottom section 22. In regard to the reference positions, as long as the reference positions are at positions further in front of the positions where the bottom sections of the cups 19 of the pair of cup bearings 18 come in contact with both end sections of the shaft section 17a, it is also possible to set the positions at the start of press-fitting, where the press-fitting amounts of the pair of cup bearings 18 is small, as the reference positions. However, from the aspect of shortening the cycle time during the press-fitting work, as described above, when the bottom sections of the cups 19 are brought close together to positions where each bottom section comes in contact with one of both end sections of the shaft section 17a, preferably, positions that are a small amount of about 0.1 mm to 1.0 mm in front of these contact positions are set as reference positions. Moreover, the press-fitting speed is arbitrarily determined from the aspect of efficiency of the press-fitting work according to the performance of the device.

Figure 2:
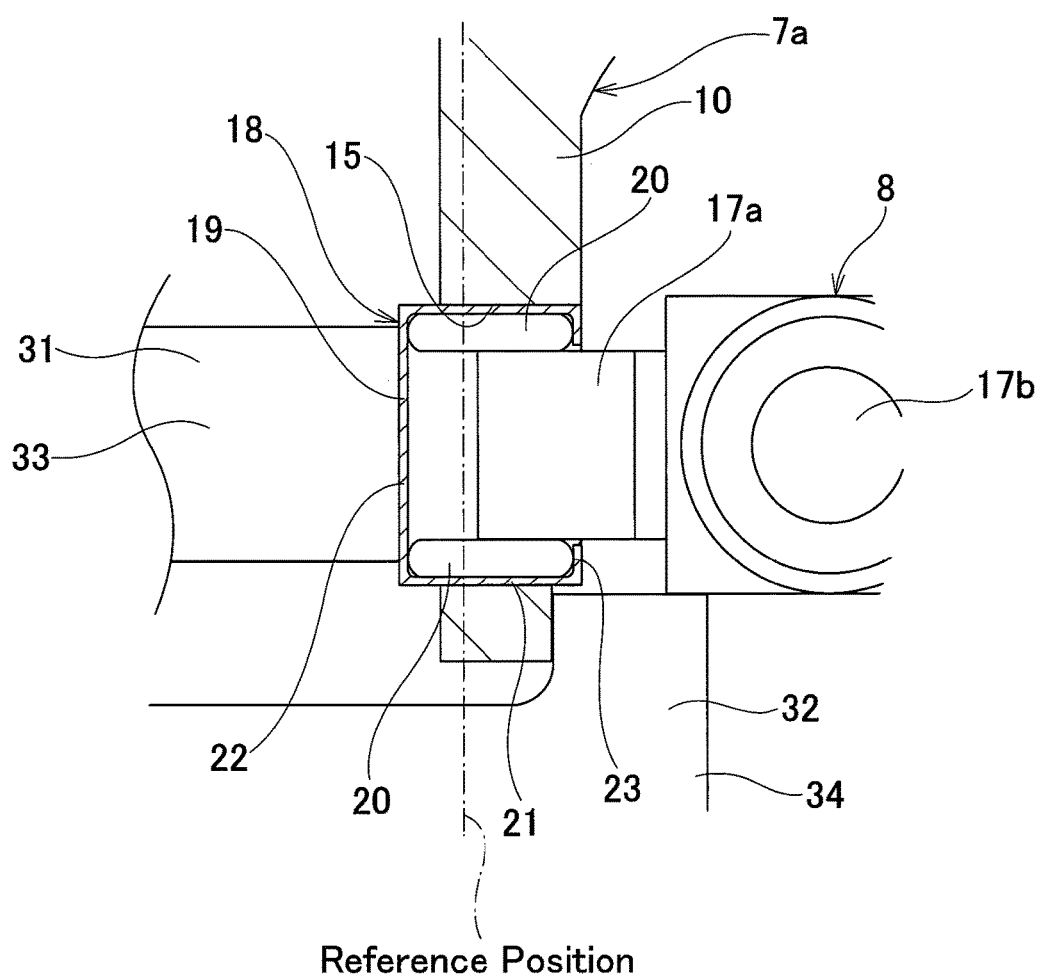
FIG. 2 is an enlarged view of part "a" in FIG. 1C, and illustrates the assembly state before press-fitting the cup bearings to the reference position.

At the instant that the pair of cup bearings 18 are press-fitted up to the reference positions, the value of the pressure that is applied to the pair of press-fitting punches 33 and measured by the pressure sensors is taken to be the reference pressure (SP) and stored in the memory of a controller of the assembly apparatus 30. At this point in time, movement in the forward directions of the pair of press-fitting punches 33 temporarily stops. FIG. 2 illustrates the position of the tip-end surface of a press-fitting punch 33 at the instant that the cup bearing 18 is press-fitted to the reference position, and for convenience, uses a chain line to illustrate a state in which the space between the tip-end surface and the end surface of the shaft section 17a is wider than in the actual case.

[(D) Intermediate-Speed and Low-Speed Press-Fitting Process]

Figure 1D:
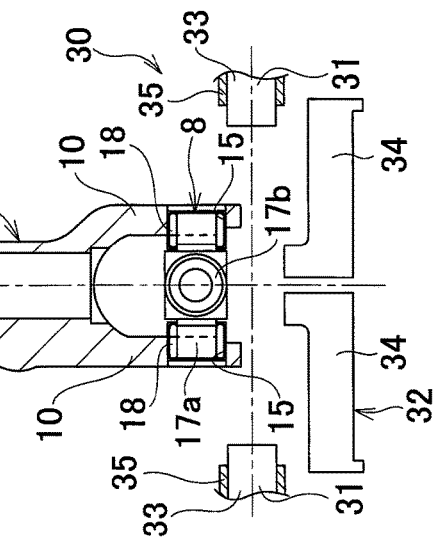
Figure 3:
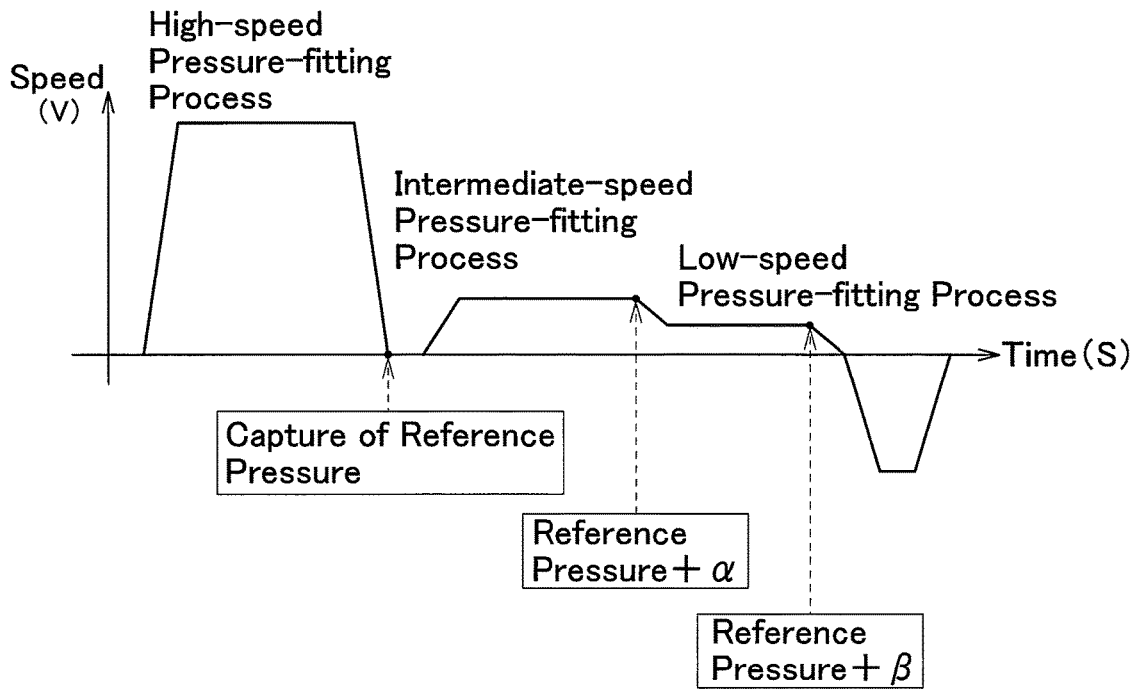
FIG. 3 is a graph schematically illustrating the relationship between the speed of press-fitting the cup bearings and the time.
Figure 4:
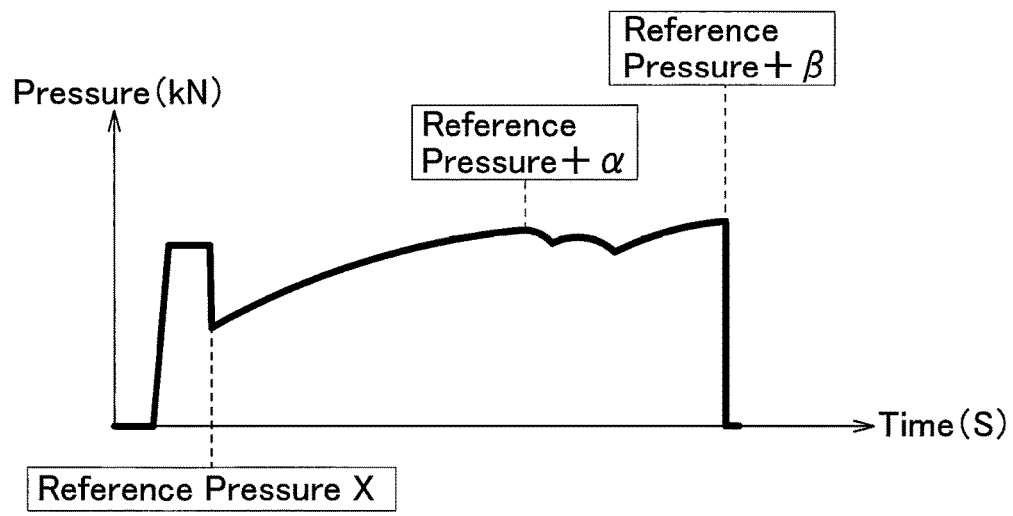
FIG. 4 is a graph illustrating the relationship between the size of the pressure applied to press-fitting punches and time.

Next, as illustrated in FIG. 1D and FIG. 3, press-fitting is restarted at an intermediate speed that is set lower than the press-fitting speed of the pair of cup bearings 18 up to that time (speed that is ½₅₀₀ to ⅟₅₀₀ the speed during high-speed press-fitting=about 0.02 mm/sec to 0.2 mm/sec). Then, as illustrated in FIG. 4, at the time that the value of the pressure applied to the pair of press-fitting punches 33 becomes greater than the reference pressure (SP) by a preset first specified value (α), the press-fitting speed of the pair of cup bearings 18 is reduced from the intermediate speed to a low speed (about half the intermediate speed=0.01 mm/sec to 0.1 mm/sec), and press-fitting is continued. Finally, when the value of the pressure applied to the pair of press-fitting punches 33 becomes greater than the reference pressure (SP) by a preset second specified value (β, β>α), it is determined that the pair of cup bearings 18 have reached the positions where press-fitting is complete, and the work of press-fitting ends.

In this way, in a state in which the pair of cup bearings 18 have been press-fitted to the completed press-fitting positions, the pair of cup bearings 18 are preloaded by bringing the inside surfaces of the bottom sections 22 in contact with the tip-end surfaces of the shaft section 17a, and then further press-fitting by a specified amount. In this example, the press-fitting speed after the pair of cup bearings 18 have reached the reference positions is made to be slower in stages as the pressure applied to the pair of press-fitting punches 33 becomes larger, and is set to an intermediate speed, after which the speed is then set to a low speed. However, it is also possible to make the press-fitting speed of the pair of cup bearings 18 slower linearly or curvilinearly. Moreover, the intermediate speed and low speed press-fitting speeds can be arbitrarily set from the aspect of efficiency of the press-fitting work according to the performance of the device. For the first specified value (α) and the second specified value (β), it is possible to find proper values beforehand by performing various kinds of simulation or testing based on the material, size, shape and the like of the yoke 7a, and of the cups 19 and needles 20 of the cup bearings 18.

[(E) Crimping Process]

Figure 1E:
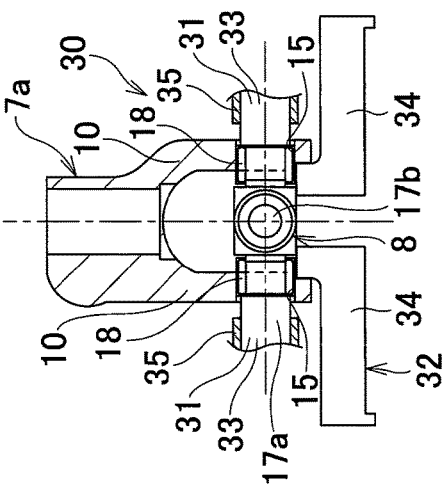

Next, as illustrated in FIG. 1E, by driving the servo motors of the pair of press-fitting/crimping devices 31 (different servo motors than the servo motors that were used for driving the press-fitting punches 33), or by driving cylinders that operate by hydraulic pressure or pneumatic pressure, the pair of crimping punches 35 are moved in the forward direction. Then, plural locations in the circumferential direction of the edge sections of the openings of the circular holes 15 of the outside surfaces of the pair of joining-arm sections 10 are plastically deformed by the tip-end surfaces of the pair of crimping punches 35 to form crimped sections 24 in those portions (refer to FIG. 11 and FIG. 12). As a result, the crimped sections 24 are pressed against the outer surfaces of the cups 19 to prevent the cups 19 from coming out from the circular holes 15. In this example, an assembly apparatus 30 in which a pair of crimping punches 35 are arranged around the outside of the pair of press-fitting punches 33 is used, however, it is also possible to use an apparatus in which the pair of press-fitting punches 33 and the pair of crimping punches 35 are separate.

[(F) Removal Process]

Figure 1F:
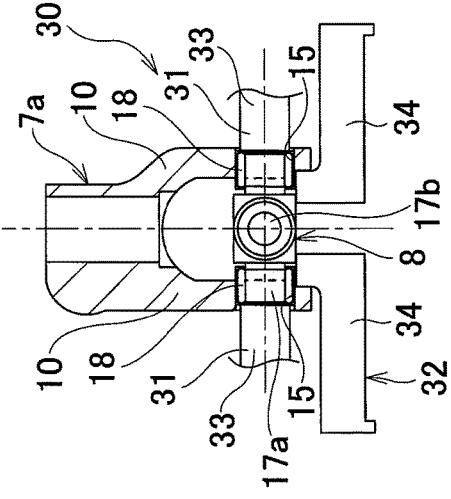

Finally, as illustrated in FIG. 1F, the pair of crimping punches 35 and the pair of press-fitting punches 33 are moved back to the initial positions. Moreover, the pair of supporting-arm sections 34 of the yoke-clamping jig 32 are moved in directions toward each other in order to remove the backup of the pair of joining-arm sections by the pair of supporting-arm sections 34. Next, the yoke 7a is moved back to the upper position of the yoke-clamping jig 32, and the yoke 7a is removed from the assembly apparatus 30.

With the assembly method of this example, it is possible to attach with good precision a pair of cup bearings 18 in portions between a pair of circular holes 15 of a yoke 7a and both end sections of shaft section 17a of a cross shaft 8 regardless of variation in dimensions of each member of a universal joint 6, and particularly regardless of variation in the inner-diameter dimensions of circular holes 15 that are formed in the yokes 7a, 7b, the outer-diameter dimension of the cup bearings 18, or the dimensions in the axial direction of the shaft sections 17a (17b) of the cross section 8.

In other words, with the reference pressure (SP), which is the value of the pressure applied to the press-fitting punches 33 at the instant when the pair of cup bearings 18 have been press-fitted to the reference positions, taken to be a reference, the pair of cup bearings 18 are press-fitted until the value of the pressure becomes larger by a preset second specified value (β). In this way, the value of the pressure applied to the press-fitting punches 33 (value of the pressure determined at the press-fitting completed positions) is finally set by taking into consideration the value of the reference pressure (SP) that changes due to variation in dimensions that occurs between the inner-diameter dimension of the circular holes 15 and the outer-diameter dimension of the cub bearings 18. Therefore, the effect that this variation has on the press-fitting amounts (press-fitting positions) of the cup bearings 18 can be eliminated.

To explain this using a detailed example, the reference pressure (SP1) when the inner-diameter dimension of the circular hole 15 is small and the outer-diameter dimension of the cup bearing 18 is large, becomes larger, for example, than the reference pressure (SP2) when the inner-diameter dimension of the circular hole 15 is large and the outer-diameter dimension of the cup bearing 18 is small (SP1>SP2). Therefore, when the press-fitting amount of the cup bearing 18 is set based only on the size of the pressure that is applied to the press-fitting punch 33, when the inner-diameter dimension of the circular hole 15 is small and the outer-dimension of the cup bearing 18 is large, there is a possibility that the press-fitting amount of this cup bearing 18 will be insufficient, and when the inner-diameter dimension of the circular hole 15 is large and the outer-dimension of the cup bearing 18 is small, there is a possibility that the press-fitting amount of this cup bearing 18 will become excessively large. On the other hand, in this example, when the inner-diameter dimension of the circular hole 15 is small and the outer-dimension of the cup bearing 18 is large, press-fitting is determined to be complete at the stage when the pressure that is applied to the press-fitting punch 33 reaches X1+β, and when the inner-diameter dimension of the circular hole 15 is large and the outer-dimension of the cup bearing 18 is small, press-fitting is determined to be complete at the stage when the pressure that is applied to the press-fitting punch 33 reaches X2+β. In this way, the size of the pressure at the position where press-fitting is determined to be complete is set by taking into consideration the value of the reference pressure (SP1, SP2) that changes due to variation in dimensions that occurs between the inner-diameter dimension of the circular holes 15 and the outer-diameter dimension of the cup bearings 18, so it is possible to eliminate the effect that this variation has on the press-fitting amounts of the pair of cup bearings 18.

Moreover, the positions where press-fitting is determined to be complete is not determined based on the press-fitting amounts of the pair of cup bearings 18, but the positions where the pressures have been increased from the reference pressures (SP1, SP2) by a preset second specified value (β) and it is possible to apply proper preloading to the pair of cup bearings 18 are determined to be the positions where press-fitting is complete. Therefore, it is possible to eliminate the effect that variation in the dimension in the axial direction of the shaft section 17a of the cross shaft 8 has on the press-fitting amounts of the pair of cup bearings 18. As a result, with the assembly method for a universal joint of this example, it is possible to attach a pair of cup bearings 18 with good precision in proper positions where proper preloading can be applied regardless of variation in the dimensions of the members of the universal joint 6.

Furthermore, the press-fitting speed during the initial stage of press-fitting until the pair of cup bearings 18 reach the reference positions is faster than the press-fitting speed during the intermediate stage and final stage of press-fitting after reaching the reference positions, so it is possible to shorten the cycle time of the press-fitting work. Particularly, in this example, after the pair of cup bearings 18 have reached the reference positions, the press-fitting speed of the pair of cup bearings 18 does not suddenly become slower from high speed to low speed, but becomes slower in stages according to the amount that the pressure applied to the pair of press-fitting punches 33 increases from the reference pressure, so it is possible to maintain the press-fitting speed to a certain extent during the intermediate stage as well, and thus it is possible to further shorten the cycle time. In this example, from the aspect of work efficiency, the work for press-fitting the pair of cup bearings 18 is performed simultaneously, however, it is also possible to perform each process in order for each of the pair of cup bearings 18, and such a case is also included within the range of the present invention.

[First Example of Second Embodiment]

FIG. 5A to FIG. 5G illustrate a first example of a second embodiment of the present invention. A feature of this example is that the assembly method for attaching a pair of cup bearings 18a, 18b with good precision is achieved by devising the press-fitting process of the pair of cup bearings 18a, 18b regardless of bending deformation of the pair of joining-arm sections 10a, 10b of the yoke 7a. The other construction, functions, and effects are the same as those of the example of a first embodiment.

The assembly method for the cross shaft universal joint 6 of this example mainly includes seven processes (A) to (G). Of these process, (A) pre-setup process, (B) backup process and (G) crimping and removal process are all the same as the example of the first embodiment. Therefore, an explanation of these processes will be omitted here.

[(C) First Press-Fitting Process]

Figure 5:
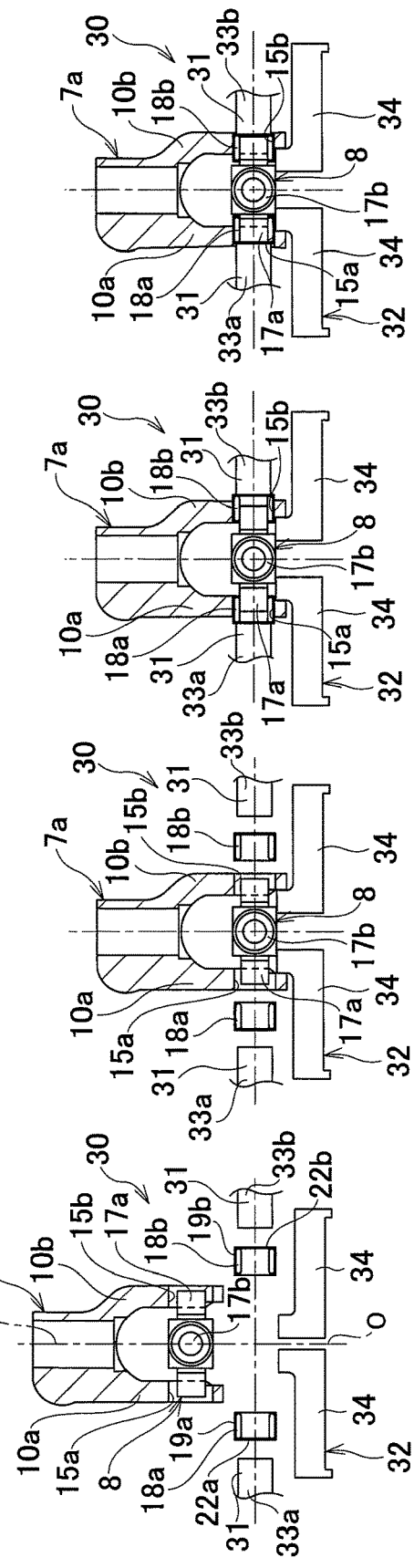
FIG. 5A to FIG. 5G are partial cross-sectional views illustrating the order of processes of the assembly method for a cross shaft universal joint of a first example of a second embodiment of the present invention.

The first press-fitting process illustrated in FIG. 5C is also similar to the high-speed press-fitting process in the example of the first embodiment. However, in this example, of the pair of press-fitting punches 33a, 33b, a press-fitting sensor is located only on the press-fitting punch 33b on the right side in FIG. 5C. In the first press-fitting process of this example as well, the feed amounts (press-fitting amounts of the cup bearings 18a, 18b) with respect to the machine center position O of the pair of press-fitting punches 33a, 33b are measured by the number of feed pulses of linear scales or servo motors, and the value of the pressure that is applied to the press-fitting punch 33b that is measured by the pressure sensor at the time when the pair of cup bearings 18a, 18b are press-fitted to preset reference positions, for example, positions about 0.1 mm to 1.0 mm further in front of positions where the inner surfaces of the bottom sections 22a, 22b of the cups 19a, 19b of the pair of cup bearings 18a, 18b come in contact with the tip-end surfaces of one of the shaft sections 17a of the cross shaft 8 is stored in the memory of a controller of the assembly apparatus 30 as the reference pressure (SP). Incidentally, in this kind of first press-fitting process, as each of the pair of cup bearings 18a, 18b is press-fitted, bending deformation of the pair of joining-arm sections 10a, 10b in the direction toward each other may occur in the portions that surround the pair of circular holes 15a, 15b.

[(D) Second Press-Fitting Process]

After the pair of cup bearings 18a, 18b have been press-fitted to the reference positions in the first press-fitting process, then as illustrated in FIG. 5D, as a second press-fitting process one of the pair of cup bearings 18a, 18b (left side in FIG. 5D) is press-fitted to the position where press-fitting is complete. In this example, while monitoring the feed amount (amount of movement with respect to the machine center position) of the press-fitting punch 33a of the pair of press-fitting punches 33a, 33b that presses one of the cup bearings 18a by the number of feed pulses of a linear scale or servo motor, the one cup bearing 18a is press-fitted to a preset position where press-fitting is complete by positioning control. On the other hand, the other cup bearing 18b of the pair of cup bearings 18a, 18b (right side in FIG. 5D) is kept stopped at the reference position. Moreover, in regard to the other press-fitting punch 33b of the pair of press-fitting punches 33a, 33b as well, is stopped in a state in which the tip-end surface thereof is in contact with the outer surface of the bottom section 22b of the cup 19b of the other cup bearing 18b. The press-fitting speed of the one cup bearing 18a from the reference position to the press-fitting completed position is set low compared to the press-fitting speed from the starting position to the reference position.

[(E) Third Press-Fitting Process]

Next, as illustrated in FIG. 5E, as a third press-fitting process, only the one press-fitting punch 33a is moved back until it is separated a specified amount (2 mm or more, and preferably 4 mm or more) from the outer surface of the bottom section 22a of the cup 19a of the one cup bearing 18a. As a result, even when bending deformation of the pair of joining-arm sections 10a, 10b occurs in directions toward each other in the portions that surround the pair of circular holes 15a, 15b, bending deformation that occurred in the one joining-arm section 10a (left side in FIG. 5E) that assembled the one cup bearing 18a is released. Therefore, due to the release of the bending deformation of the one joining-arm section 17a, a space is formed between the inner surface of the bottom section 22a of the cup 19a of the one cup bearing 18a and one of the tip-end surfaces of both end sections of the one shaft section 17a.

Moreover, in this example, after the one press-fitting punch 33a has been moved back, the other press-fitting punch 33b is moved in the forward direction, and the press-fitting work begins again for the other cup bearing 18b. In this example as well, as in the example of the first embodiment, the press-fitting work for the other cup bearing 18b begins again with the press-fitting speed of the other cup bearing 18b being at an intermediate speed that is set to be lower than the speed during the first press-fitting process (speed that is about 1/2500 to 1/500 the speed during high-speed press-fitting). As a result, at the same time that the other cup bearing 18b is pressed to the rear side of the circular hole 15b, the cross shaft 8 is pressed in the axial direction of the shaft section 17a toward the one cup bearing 18a by way of the other cup bearing 18b. Then, the space that was formed between the inner surface of the bottom section 22a of the cup 19a of the one cup bearing 18a and the tip end surface of one end section of the shaft section 17a is gradually reduced until finally the space becomes zero.

[(F) Fourth Press-Fitting Process]

Figure 6:
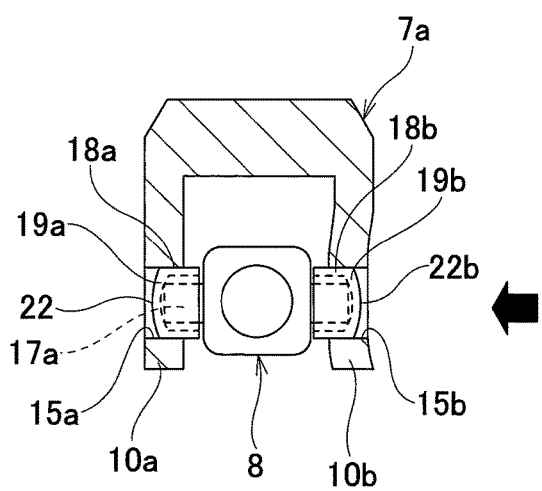
FIG. 6A and FIG. 6B are schematic views illustrating a fourth press-fitting process.
Figure 6:
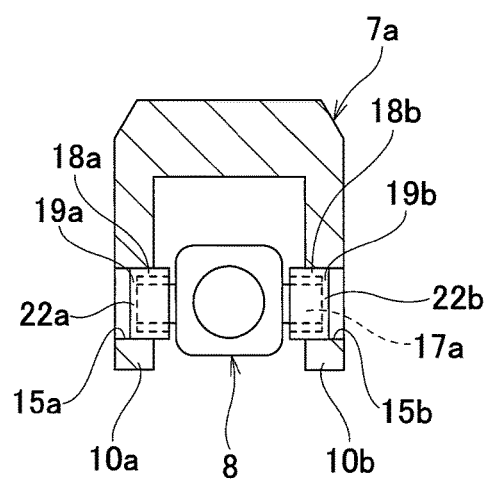

As illustrated in FIG. 5F, as a fourth press-fitting process, at the instant that the value of the pressure that is applied to the other press-fitting punch 33b becomes larger than the reference pressure (SP) by a preset first specified value ($\alpha$), the press-fitting speed of the other cup bearing 18*b* is reduced from the intermediate speed to low speed (speed that is about half the intermediate speed), and press-fitting is continued. Then, finally, the other cup bearing 18*b* and the cross shaft 8 are pressed to a position such as illustrated in FIG. 6A, and at the instant that the value of the pressure applied to the other press-fitting punch 33*b* becomes larger than the reference pressure (SP) by a preset second specified value ($\beta$, $\beta > \alpha$), it is determined that the other cup bearing has reached the position where press-fitting is complete.

In this example, in the state in which the other cup bearing 18*b* has been pressed to the press-fitting complete position, elastic deformation occurs in not only the bottom section 22*b* of the cup 19*b*, but also in the bottom section 22*a* of the cup 19*a*. Next, the other press-fitting punch 33*b* is moved back until separated from the outer surface of the bottom section 22*b* of the cup 19*b*, and the press-fitting work ends. By moving the other press-fitting punch 33*b* back, the bending deformation that occurred in the other joining-arm section 10*b* (right side in FIG. 5F and FIG. 6B) that assembled the other cup bearing 18*b* is released. At the same time as this, the elastic deformation that occurred in the cups 19*a*, 19*b* also is released.

In this example, after setting the press-fitting speed after the other cup bearing 18*b* has reached the reference position to an intermediate speed, the speed is set to low speed, and the press-fitting speed is made to be slower in stages as the pressure that is applied to the other press-fitting punch 33*b* becomes larger. However, it is also possible to continuously make the press-fitting speed of the other cup bearing 18*b* slower (linearly or curvilinearly). Moreover, for the first specified value ($\alpha$) and the second specified value ($\beta$) proper values are found beforehand by performing various simulation and testing based on the material, size and shaft of the yoke 7*a* and the cup bearings 18*a*, 18*b* (cups 19*a*, 19*b*, needles 20). Particularly, the second specified value ($\beta$) is preferably a value that is larger than the value of proper preloading that can be applied to the other cup bearing 18*b* in the case when bending deformation does not occur in the other joining-arm section 10*b* by the amount that preloading is lost due to a release of the bending deformation of the other joining-arm section 10*b*.

With the assembly method of this example, it is possible to attach the pair of cup bearings 18*a*, 18*b* with good precision to portions between the circular holes 15*a*, 15*b* that are formed in the tip-end sections of the pair of joining-arm sections 10*a*, 10*b* and both end sections of the shaft section 17*a* of the cross shaft 8 regardless of bending deformation of the pair of joining-arm sections 10*a*, 10*b* of the yoke 7*a*.

In other words, in this example, after bending deformation of one of the joining-arm sections 10*a* of the pair of joining-arm sections 10*a*, 10*b* is released, the other press-fitting punch 33*b* is used to press the other cup bearing 18*b* with the cross shaft 8 so as to eliminate the space between the inner surface of the bottom section 22*a* of the cup 19*a* of the one cup bearing 18*a* and the tip-end surface of the one end section of the shaft section 17*a* that occurred by releasing the bending deformation of the one joining-arm section 10*a*. Therefore, in the state in which the other cup bearing 18*b* is press-fitted to the press-fitting complete position, and assembly is complete, the total amount of movement that the inner surfaces of the bottom sections 22*a*, 22*b* of the cups 19*a*, 19*b* of the pair of cup bearings 18*a*, 18*b* move in directions going away from both end surfaces of the shaft section 17*a* can be suppressed by the amount of bending deformation of the other joining-arm section 10*b*. Consequently, as illustrated in FIG. 15, when compared with the case in which the movement is the total amount of bending deformation of the pair of joining-arm sections 10, the amount of movement can be reduced to about half. Moreover, the amount of movement due to only bending deformation of the other joining-arm section 10*b* is small, so it is possible to absorb that amount of movement by the elastic deformation of the bottom sections 22*a*, 22*b* of the cups 19*a*, 19*b* within the range of preloading. In other words, the value of the second specified value ($\beta$) is a value that is larger than the value of proper preloading that can be applied to the other cup bearing 18*b* when bending deformation does not occur in the other joining-arm section 10*b*, by just the amount that preloading is lost due to the release of bending deformation of the other joining-arm section 10*b*. When deliberately causing the cups 19*a*, 19*b* to elastically deform and releasing bending deformation of the other joining-arm section 10*b*, applying proper preloading to the pair of cup bearings 18*a*, 18*b* is made possible by also releasing the elastic deformation of the cups 19*a*, 19*b*. Therefore, with the assembly method of this example, it is possible to attach the pair of cup bearings 18*a*, 18*b* with good precision in proper positions where proper preloading can be applied.

Moreover, in this example as well, it is possible to attach the pair of cup bearings 18*a*, 18*b* with good precision in positions where proper preloading can be applied regardless of variation in the dimensions of the members of the cross shaft universal joint 6. In other words, the reference pressure (SP), which is the value of the pressure applied to the other press-fitting punch 33*b* at the instant that the other cup bearing 18*b* is press-fitted to the reference position is taken to be a reference, and the other cup bearing 18*b* is press-fitted until the pressure increases by the amount of a preset second specified value ($\beta$). That is, in this example, the value of the pressure that is finally applied to the other press-fitting punch 33*b* (value of the pressure determined at the press-fitting complete position) is determined in consideration to the value of the reference pressure (SP) that changes due to variation in dimensions that occurs between the inner-diameter dimension of the circular hole 15*b* and the outer-diameter dimension of the other cup bearing 18*b*, so the effect that this variation has on the amount of press-fitting (press-fitting position) of the other cup bearing 18*b* can be eliminated.

[Second Example of Second Embodiment]

Figure 7:
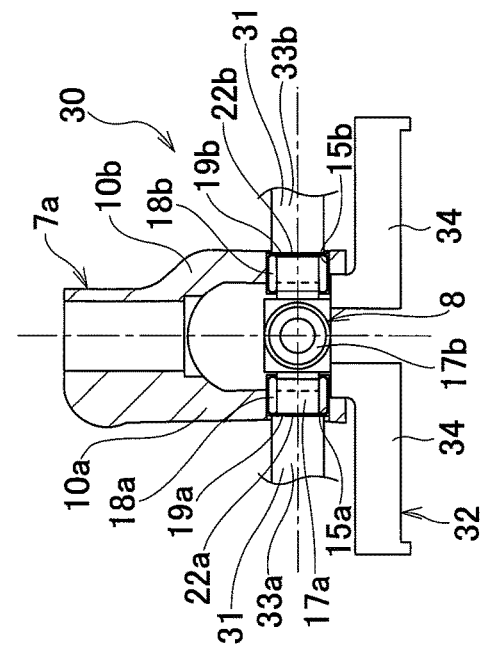
FIG. 7A to FIG. 7D are partial cross-sectional views illustrating only the press-fitting process of the assembly method for a cross shaft universal joint of a second example of a second embodiment of the present invention.
Figure 7:
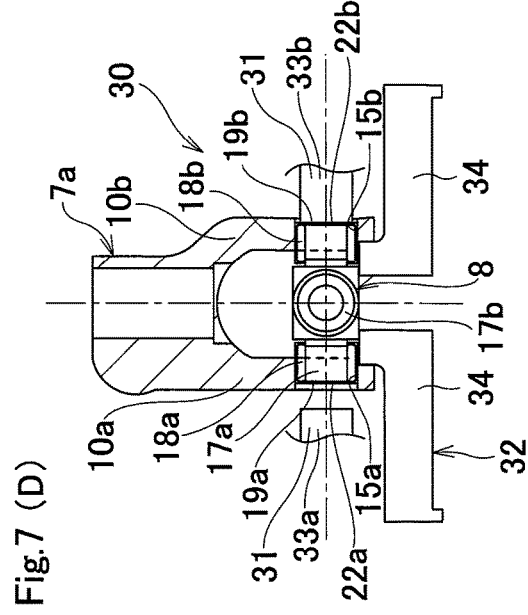
Figure 7:
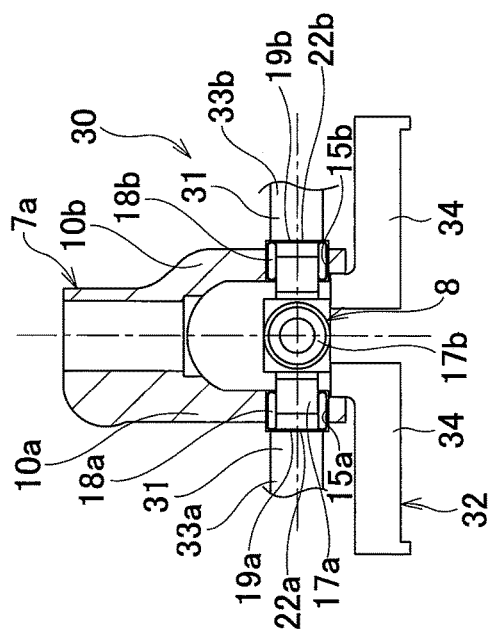
Figure 7:
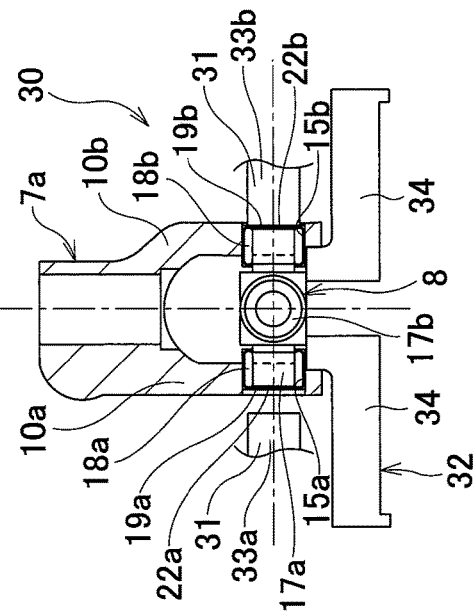

FIG. 7 illustrates a second example of a second embodiment of the present invention. This example differs from the first example of the second embodiment only in that the press-fitting process differs, and the other processes and assembly apparatus 30 used are basically the same.

[(C') First Press-Fitting Process]

In this example as well, when the (A) pre-setup process, and (B) backup process are completed, as illustrated in FIG. 7A, a first press-fitting process is performed in nearly the same way as in the high-speed press-fitting process of the example of the first embodiment and in the first press-fitting process in the first example of the second embodiment. In this example as well, the size of the pressure that is applied to the press-fitting punch 33*b* is measured using a pressure sensor that is arranged in press-fitting punch 33*b* on the right side in FIG. 7A, however, the pair of cup bearings 18*a*, 18*b* are press-fitted at high speed until the pair of cup bearings 18*a*, 18*b* reach preset reference positions, for example positions that are about 0.1 mm to 1.0 mm in front of the positions where the inner surfaces of the bottom sections 22*a*, 22*b* of the cups 19*a*, 19*b* of the pair of cup bearings 18*a*, 18*b* come in contact with the tip-end surfaces of one of the shaft sections 17a of the cross shaft 8, and at that instant, the value of the pressure that is applied to the press-fitting punch 33b that is measured by the pressure sensor is not handled as the reference pressure (SP).

[(D) Second Press-Fitting Process]

After that, as illustrated in FIG. 7B, as the second press-fitting process, as in the first example of the second embodiment, one cup bearing 18a (right side in FIG. 7B) of the pair of cup bearings 18a, 18b is press-fitted to the position where press-fitting is complete.

[(E) Third Press-Fitting Process]

Next, as illustrated in FIG. 7C, as a third press-fitting process, as in the first example of the second embodiment, only one press-fitting punch 33a is moved back until separated from the outer surface of the bottom section 22a of the cup 19a of the one cup bearing 18a by a specified amount (for example, 2 mm or more, and preferably 4 mm or more); and even in the case in which bending deformation occurs in one of the joining-arm sections 10a, 10b, the bending deformation that occurred in the one joining-arm section 10a (left side in FIG. 7C) that assembled the one cup bearing 18a is released. As a result, a space is formed between the inner surface of the bottom section 22a of the cup 19a of the one cup bearing 18a and the tip-end surface of one end section of the shaft section 17a.

In this example as well, the press-fitting work for the other cup bearing 18b is restarted by setting the press-fitting speed of the other cup bearing 18b to an intermediate speed that is less than in the first press-fitting process (speed that is about 1/2500 to 1/500 the speed during high-speed press-fitting), and while monitoring the pressure applied to the other press-fitting punch 33b and the press-fitting position, together with pressing the other cup bearing 18b toward the rear of the circular hole 15b, the cross shaft 8 is pressed in the axial direction of the shaft section 17a toward the one cup bearing 18a by way of the other cup bearing 18b, which gradually reduces the space that is formed between the inner surface of the bottom section 22a of the cup 19a of the one cup bearing 18a and the tip-end surface of the one end section of the shaft section 17a until finally the space becomes zero.

[(F') Fourth Press-Fitting Process]

In this example, as illustrated in FIG. 7D, as a fourth press-fitting process, at the instant when the press-fitting amount (press-fitting position) of the other cup bearing 18b reaches a preset specified position, the press-fitting speed of the other cup bearing 18b is reduced from intermediate speed to low speed (speed that is about half the intermediate speed), and press-fitting continues. Then, while monitoring the value of the pressure that is applied to the other press-fitting punch 33b, by detecting the inflection point that indicates that the tip-end surface of the one end section of the shaft section 17a has begun to come in contact with the inner surface of the bottom section 22a of the cup 19a of the one cup bearing 18a (point where the value of the pressure changes to an increasing tendency), the value of the pressure at this inflection point is set as a reference pressure (SP). Then, at the instant when the value of the pressure that is applied to the other press-fitting punch 33b has become larger than this reference pressure (SP) by only a preset specified amount (v), the other cup bearing 18b is determined to have reached the position where press-fitting is complete. Next, the other press-fitting punch 33b is moved back until separated from the outer surface of the bottom section 22b of the cup 19b of the other cup bearing 18b, and the press-fitting work ends. Moreover, by moving the other press-fitting punch 33b back, the bending deformation that occurred in the other joining-arm section 10b (right side in FIG. 12) that assembled the other cup bearing 18b is released. The press-fitting speed after the other cup baring 18b has reached the reference position can also be gradually slowed (linearly or curvilinearly). Moreover, for the specified value (v), a proper value is found beforehand by performing various simulation and testing based on the material, size, shape and the like of the yoke 7a and the pair of cup bearings 18a, 18b (cups 19a, 19b, needles 30). Particularly, the specified value (v) is preferably a value that is larger than the value where proper preloading can be applied to the other cup bearing 18b when bending deformation does not occur in the other joining-arm section 10b, by the amount that preloading is lost due to the release of bending deformation of the other joining-arm section 10b.

In the assembly method of this example as well, it is possible to attach the pair of cup bearings 18a, 18b with good precision to portions between the circular holes 15a, 15b that are formed in the tip-end sections of the pair of joining-arm sections 10a, 10b and both end sections of the shaft section 17a of the cross shaft 8 regardless of bending deformation of the pair of joining-arm sections 10a, 10b of the yoke 7a.

Moreover, in this example as well, it is possible to attach the pair of cup bearings with good precision to proper positions where proper preloading can be applied regardless of variation in the dimension of the members of the universal joint 6. In other words, in this example, the value of the pressure at the inflection point that indicates the point in time when the tip-end surface of the shaft section 17a of the cross shaft 8 begins to come in contact with the inner surface of the bottom section 22a of the cup 19a of the one cup bearing 18a is taken to be the reference pressure (SP), and the other cup bearing 18b is press-fitted until the pressure increases by just a preset value (v). In this way, the value of the pressure that is finally applied to the other press-fitting punch 33b (value of the pressure determined at the press-fitting complete position) is not affected by variation of the dimensions that occur between the inner-diameter dimensions of the circular holes 15a, 15b and the outer-diameter dimensions of the cup bearings 18a, 18b, and is determined with the value of the pressure at the inflection point as a reference, so the effect that this variation has on the amount of press-fitting (press-fitting position) of the other cup bearing 18b can be eliminated. Moreover, the press-fitting complete position is not determined based on the press-fitting amount of the cup bearing 18b, but the position where the pressure increases by just a preset value (v) from the reference pressure (SP) is determined as the press-fitting complete position where a proper preload can be applied to the other cup bearing 18b. Therefore, the effect that the variation in the dimension in the axial direction of the shaft section 17a has on the press-fitting amount of the other cup bearing 18b can also be eliminated. Consequently, with the assembly method of this example, it is possible to attach the pair of cup bearings 18a, 18b with good precision to proper positions where proper preloading can be applied regardless of variation in the dimensions of the members of the universal joint 6. The other construction, functions, and effects are the same as in the case of the first example of a second embodiment.

[First Example of Third Embodiment]

FIG. 8A to FIG. 8D illustrate a first example of a third embodiment of the present invention. A feature of this example is that, of the pre-setup process, backup process, press-fitting process, crimping process and removal process, by devising the backup process for the yoke 7a, it is possible to attach cup bearings 18 with good precision regardless of variation in the dimensions of the inside surface of the pair of joining-arm sections 10 of the yoke 7a (distances from the center axis X of the yoke to each of the inside surfaces of the pair of joining-arm sections 10). The other construction, assembly method, functions, and effects of the universal joint 6 are the same as those of a conventional universal joint. Moreover, explanations of these are the same as in the example of a first embodiment, so are simplified or omitted in the explanation below.

[(A) Pre-Setup Process]

Figure 8:
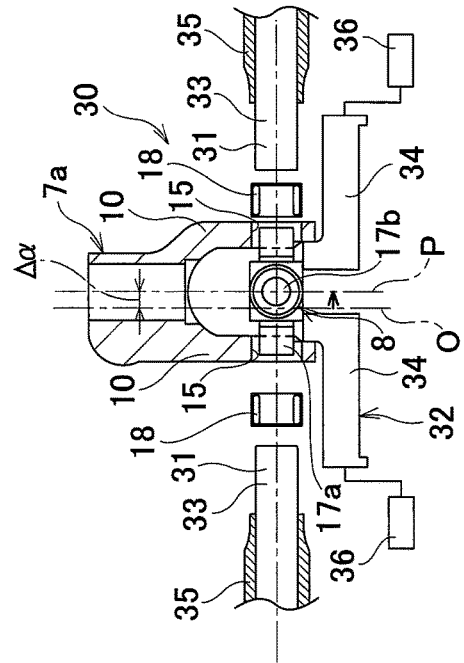
FIG. 8A to FIG. 8D are partial cross-sectional views of the order of processes of the assembly method for a cross shaft universal joint of a first example of a third embodiment of the present invention.
Figure 8:
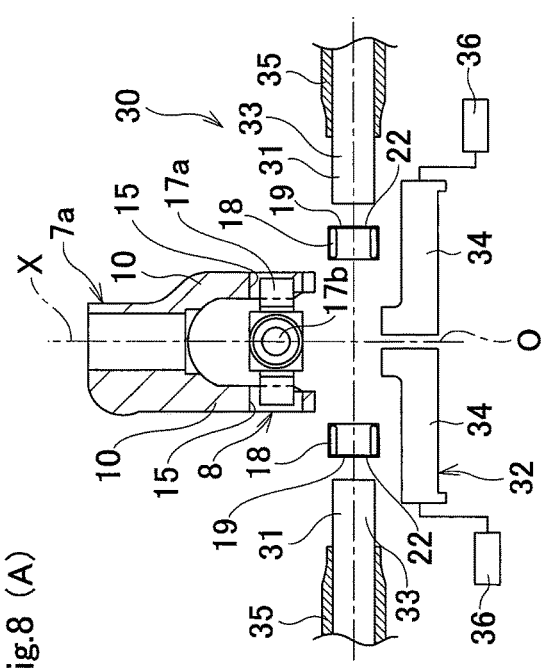
Figure 8:
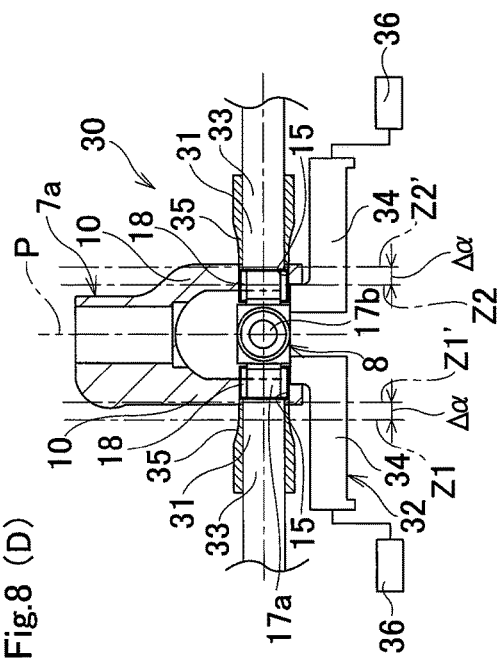
Figure 8:
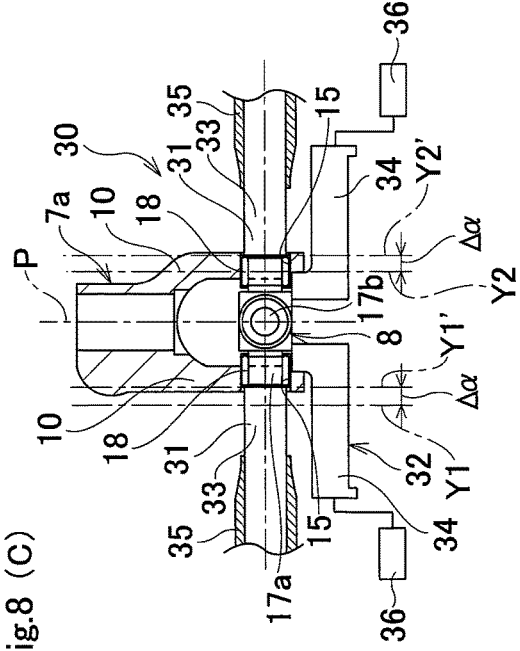

As illustrated in FIG. 8A, as a pre-setup process, in a state in which both end sections of one of the shaft sections 17a of the cross shaft 8 pre-assembled are inserted inside circular holes 15 that are formed in a pair of joining-arm sections 10 of a yoke 7a, the yoke 7a is positioned above a yoke-clamping jig 32 and aligned with the center position O (machine center position) in the center axis direction of circular holes 15 in a pair of supporting-arm sections 34 of the yoke-clamping jig 32, which are support members for the pair of joining-arm sections 10, and the center axis X of the yoke 7a, and is maintained so as to face downward by a chuck (not illustrated in the figure).

[(B) Backup Process]

Next, as illustrated in FIG. 8B, as a backup process, the yoke 7a is lowered just a specified amount, and the center holes 15 that are formed in the tip-end sections of the pair of joining-arm sections 10, and pairs of press-fitting punches 33 and crimping punches 35 are positioned on the same axis. Moreover, in this state, the tip-end sections of a pair of supporting-arm sections 34 are inserted between the inside surfaces of the tip-end sections of the pair of joining-arm sections 10. The pair of supporting-arm sections 34 are driven by separate servo motors 36, and are able to move away from or closer to each other in a direction that is parallel to the center axis of the circular holes 15 (left-right direction in FIG. 8B). Movement of the pair of supporting-arm sections 34 (open-closing movement) can be controlled by controlling the torque of the servo motors 36.

Next, by driving each of the server motors 36, the pair of supporting-arm sections 34 are moved from the machine center position O in directions away from each other, and the outside surfaces of the tip-end sections of the pair of supporting-arm sections 34 are brought into contact with the inside surfaces of the tip-end sections of the pair of joining-arm sections 10. In this example, the movement speed and the timing for starting movement of the pair of supporting-arm sections 34 are shifted so that operation of the pair of supporting-arm sections 34 does not completely coincide (does not synchronize). The pair of supporting-arm sections 34 are moved so as to move away from each other until reaching specified torques that are equal to each other and that were preset for the servo motors 36, or in other words, until torques are generated that make it possible to apply a pressing force that allows the pair of joining-arm sections 10 to be sufficiently backed up. In this example, during execution of the backup process, the yoke 7a is held by a chuck so that at least movement that is parallel to the center-axis direction of the circular holes 15 is possible, or the yoke 7a that is held by the chuck is released at the instant that support by the pair of supporting-arm sections 34 begins. As a result, as illustrated in FIG. 8B, as the pair of supporting-arm sections 34 move, the yoke 7a moves parallel so as to shift in the center-axis direction of the circular holes 15. This amount of shifting includes the amount of shifting due to variation in the dimensions of the inside surfaces of the pair of joining-arm sections 10. Then, at the instant that the preset specified torques that are equal to each other and that were preset for the servo motors 36 are generated, movement of the pair of supporting-arm sections 34 stops, and the pair of supporting-arm sections 34 support the inside surfaces of the tip-end sections of the pair of joining-arm sections 10.

Then, at the instant that the backup process is completed, the center position of the pair of supporting-arm sections 34 (central position between the outside surfaces of the tip-end sections) P is found. In this example, the pair of supporting-arm sections 34 are each moved by respective servo motors 36, so by controllers of the assembly apparatus 30 that control the servo motors 36 calculating the feed amount (amount of movement from the machine center position O) of each of the pair of supporting-arm sections 34 using the number of pulses of the servo motors 36, it is possible to find the center position P of the pair of supporting-arm sections 34. After the center position P of the pair of supporting-arm sections 34 has been found, the amount of shifting ($\Delta\alpha$) of the center position P from the machine center O is found. Moreover, before the following press-fitting process, a bearing-supply device (not illustrated in the figure) is used to supply a pair of cup bearings 18 so as to be on the same axis as the circular holes 15 and press-fitting punches 33. As illustrated in FIG. 8A, the pair of cup bearings 18 can also be supplied in the stage of the pre-setup process, and wait.

[(C) Press-Fitting Process]

Next, as illustrated in FIG. 8C, by driving the servo motors of a pair of press-fitting/crimping devices 31, each of the pair of press-fitting punches 33 is moved in the forward direction (directions toward each other), and the pair of cup bearings 18 are simultaneously press-fitted inside the circular holes 15 from the outside-surface sides of the pair of joining-arm sections 10. When doing this, the feed amount (amount of movement in the forward direction) of the pair of press-fitting punches 33 is corrected according to the amount of shifting ($\Delta\alpha$). More specifically, the center position P of the pair of supporting-arm sections 34 shifts to the right side from the machine center O by an amount $\Delta\alpha$, so the tip-end surface of the press-fitting punch 33 on the left side in FIG. 8C is set so as to move to a position (corrected instructed press-fitting position Y1') where $\Delta\alpha$ is added to the normal instructed press-fitting position (press-fitting complete position that is set presuming that shifting does not occur) Y1, and conversely, the tip-end surface of the press-fitting punch 33 on the right side in FIG. 8C is set so as to move to a position (corrected instructed press-fitting position Y2') where $\Delta\alpha$ is subtracted from the normal instructed press-fitting position Y2. Then, the pair of press-fitting punches 33 are moved to set corrected instructed press-fitting positions (Y1', Y2'), and the press-fitting work ends. In the state in which the pair of press-fitting punches 33 have been moved to the corrected instructed press-fitting positions (Y1', Y2'), the pair of cup bearings 18 are press-fitted until the inner surfaces of the bottom sections 22 have come in contact with the tip-end surfaces of the shaft section 17a, and then further press-fitted a specified amount to apply preloading to the pair of cup bearings 18.

[(D) Crimping and Removal Process]

Next, as illustrated in FIG. 8D, a pair of crimping punches 35 are moved in the forward direction. In this example, the feed amount (amount of movement in the forward direction) of the pair of crimping punches 35 is corrected according to a shifting amount ($\Delta\alpha$). More specifically, the center position P of the pair of supporting-arm sections 34 at the instant that the backup process is completed is shifted just an amount $\Delta\alpha$ to the right side from the machine center position O, so the position of the tip-end surface of the crimping punch 35 on the left side in FIG. 8D is set so as to move to a position (corrected instructed crimping position Z1') where Δα is added to the normal instructed crimping position (set crimping complete position when it is presumed that no shifting occurs) Z1, and conversely, the position of the tip-end surface of the crimping punch 35 on the right side in FIG. 8D is set so as to move to a position (corrected instructed crimping position Z2') where Δα is subtracted from the normal instructed crimping position (set crimping complete position when it is presumed that no shifting occurs) Z2. Then, the tip-end surfaces of the pair of crimping punches 35 are moved to the respective corrected instructed crimping positions that were set (Z1', Z2'), and the tip-end surfaces of the pair of crimping punches 35 cause plural locations in the circumferential direction of the inner-circumferential edges of the circular holes 15 to plastically deform. Then, crimped sections 24 are formed in the appropriate portions. As a result, the crimped sections 24 press against the outer surfaces of the bottom sections 22 of the cups 19, and prevent the cups 19 from coming out from the circular holes 15.

Finally, the pair of crimping punches 35 and the pair of press-fitting punches 33 are moved back to the respective initial positions, and the pair of supporting-arm sections 34 of the yoke clamping jig 32 are moved in directions toward each other to release the backup of the pair of joining-arm sections 10 by these supporting-arm sections 34, and further, the yoke 7a is removed from the assembly apparatus 30 by moving the yoke 7a back to the position above the yoke clamping jig 32.

With the assembly method of this example, it is possible to attach the pair of cup bearings 18 with good precision to portions between the circular holes 15 of the yoke 7a and both end sections of the shaft section 17a of the cross shaft 8 regardless of variation in the dimensions of the inside surfaces of the pair of joining-arm sections 10 of the yoke 7a.

In other words, in this example, by using the number of pulses of the servo motors 36 that move the pair of supporting-arm sections 34, the amount of shifting (Δα) from the machine center O of the pair of supporting-arm sections 34 to the center position P of the pair of supporting-arm sections 34 in the state of supporting the pair of joining-arm sections 10 is found, and based on this shifting amount, the respective amounts that the pair of press-fitting punches 33 and the pair of crimping punches 35 are moved in the forward direction are corrected. Therefore, it is possible to eliminate the effect that the variation in the dimension of the inside surfaces of the pair of joining-arm sections 10 have on the amount of movement in the forward direction of the pair of press-fitting punches 33 and the pair of crimping punches 35. Consequently, it is possible to attach the pair of cup bearings 18 with good precision to proper positions where proper preloading can be applied, and make it possible to sufficiently prevent the pair of cup bearings 18 from coming out by preventing an insufficient amount of crimping (amount of plastic deformation) of the crimped sections 24, regardless of variation in the dimensions of the inside surfaces of the pair of joining-arm sections 10.

Moreover, the pair of joining-arm sections 10 are supported by moving the pair of supporting-arm sections 34 until a specified torque is generated in the servo motors 36, so it is possible to support the pair of joining-arm sections 10 with proper force regardless of variation in the dimensions of the inside surfaces of the pair of joining-arm sections 10.

[Second Example of Third Embodiment]

Figure 9:
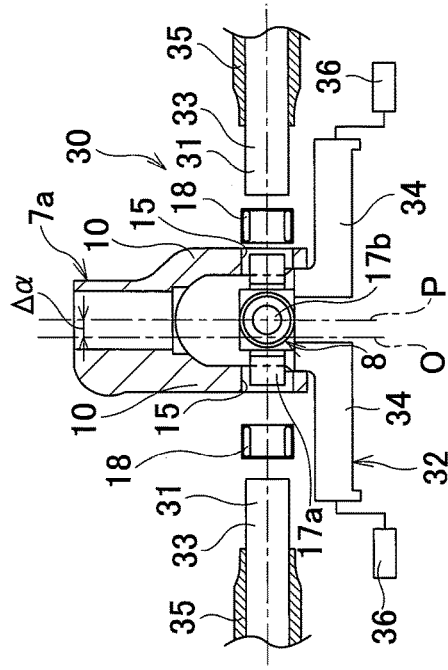
FIG. 9A to FIG. 9D are partial cross-sectional views of the order of processes of the assembly method for a cross shaft universal joint of a second example of a third embodiment of the present invention.
Figure 9:
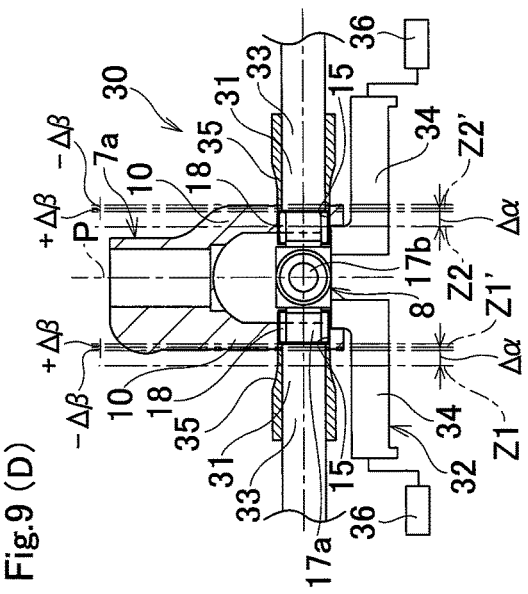
Figure 9:
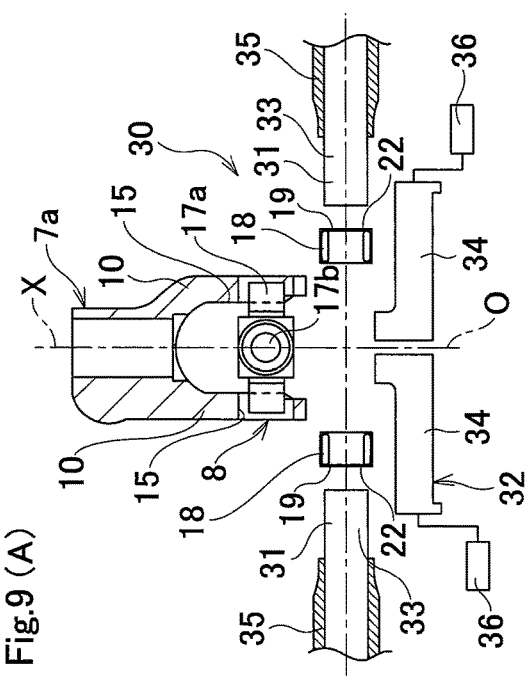
Figure 9:
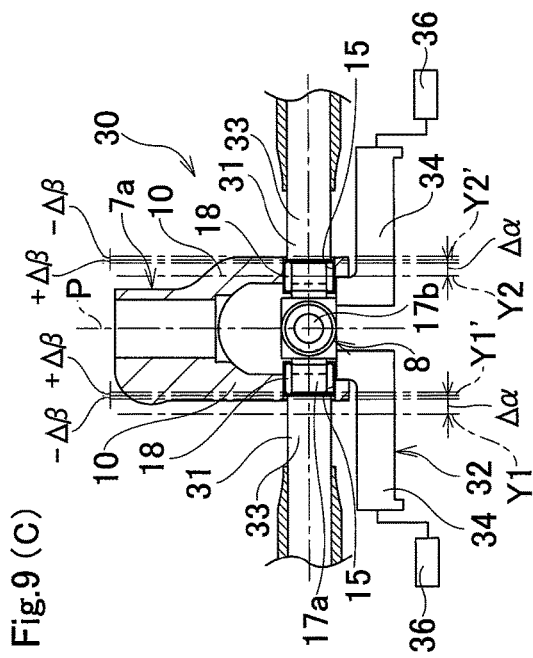

FIG. 9A illustrates a second example of a third embodiment of the present invention. A feature of this example is that the effect that variation in the dimension in the axial direction of the shaft section 17a of the cross section 8, and the variation in the dimension in the thickness of the bottom sections 22 of the cups 19 of the cup bearings 18 have on the amount of movement in the forward direction of the press-fitting punches 33 and the crimping punches 35 is eliminated. The other processes, functions, and effects are the same as those of the first example of the third embodiment.

In this example, in the press-fitting process, as illustrated in FIG. 9B and FIG. 9C, when moving the pair of press-fitting punches 33 and simultaneously press-fitting the pair of cup bearings 18 in the circular holes 15 from the outside-surface sides of the pair of joining-arm sections 10, the feed amounts of the pair of press-fitting punches 33 are corrected according to an amount of shifting (Δα) from the machine center position O of the pair of supporting-arm sections 34 to the center position P of the pair of supporting-arm sections 34 in a state of supporting the pair of joining-arm sections 10.

Furthermore, in this example, the size of the pressure (press-fitting reaction force) that is applied to the pair of press-fitting punches 33 is measured by pressure sensors that are arranged in each of the pair of pressures-fitting punches 33. In other words, there is a possibility due to variation in the dimension tolerances of the dimension in the axial direction of the shaft section 17a of the cross shaft 8, or the thickness dimension of the bottom sections 22 of the cups 19 that proper preloading will be applied to the pair of cup bearings 18 before the pair of press-fitting punches 33 reach the corrected instructed press-fitting positions (Y1', Y2'), or that even in the state that the pair of press-fitting punches 33 have reached the corrected instructed press-fitting positions (Y1', Y2'), proper preloading will not be applied to the pair of cup bearings 18, and preloading will be insufficient. Therefore, in this example, even when the feed amounts of the pair of press-fitting punches 33 have not reached the corrected instructed press-fitting positions (Y1', Y2'), the press-fitting work is ended at the instant when the value of the pressure that is applied to the pair of press-fitting punches 33 reaches a preset specified value. Then, the difference (−Δβ) between the positions where press-fitting by the pair of press-fitting punches 33 actually ended and the corrected instructed press-fitting positions (Y1', Y2') is found. Conversely, when the value of the pressure that is applied to the pair of press-fitting punches 33 does not reach the specified value even though the feed amounts of the pair of press-fitting punches 33 have reached the corrected instructed positions (Y1', Y2'), movement in the forward direction continues and the press-fitting work ends when the value of the pressure reaches the specified value. Then, the difference (+Δβ) between the positions where press-fitting by the pair of press-fitting punches 33 actually ended and the corrected instructed press-fitting positions (Y1', Y2') is found.

In this example, in the crimping process as well, the feed amounts of the pair of crimping punches 35 are corrected according to the two amounts of shifting Δα and Δβ. More specifically, the center position P of the pair of supporting-arm sections 34 shift from the machine center position O to the right side by only an amount Δα, so the position of the tip-end surface of the crimping punch 35 on the left side in FIG. 9D is set to move to a position where Δβ is further added to or subtracted from a first corrected instructed crimping position (Z1') that is a position where Δα has been added to the normal instructed crimping position Z1 (second corrected instructed crimping position Z1'±Δβ), and conversely, the position of the tip-end surface of the crimping punch 35 on the right side in FIG. 9D is set to move to a position where Δβ is further added to or subtracted from a first corrected instructed crimping position (Z2') that is a position where Δα has been subtracted from the normal instructed crimping position Z2 (second corrected instructed crimping position Z2'±Δβ). Then, the tip-end surfaces of the pair of crimping punches 35 are moved to the respectively set second corrected instructed crimping positions (Z1'±Δβ, Z2'±Δβ), and the tip-end surfaces of the pair of crimping punches 35 plastically deform the outside surfaces of the pair of joining-arm sections 10 at plural locations in the circumferential direction of the opening edge sections of the circular holes 15. Then, the pair of crimping punches 35 form crimped sections 34 in appropriate locations (see FIG. 16 to FIG. 18). As a result, the crimped sections 24 are pressed against the outside surfaces of the bottom sections 22 of the cups 19 and prevent the cups 19 from coming out of the circular holes 15.

In this example, it is possible to eliminate the effect that the variation in the dimension in the axial direction of the shaft section 17a of the cross shaft 8 and the thickness dimension of the bottom sections 22 of the cups 19 have on the amounts of movement in the forward direction of the pair of press-fitting punches 33 and the pair of crimping punches 35. Therefore, it is possible to apply proper preloading to the pair of cup bearings 18, and properly maintain the amount of crimping of the crimped sections 24 regardless of variation in the dimension in the axial direction of the shaft section 17a of the cross shaft 8 and the thickness dimension of the bottom sections 22 of the cups 19. Consequently, it is possible to attach the pair of cup bearings 18 with good precision.

The present invention is not limited to the example of a first embodiment, the first and second examples of a second embodiment, and the first and second examples of a third embodiment. As long as there is no mutual conflict, these embodiments can be combined with each other, and such embodiments are also included in the present invention.

INDUSTRIAL APPLICABILITY

The assembly method of the present invention is not limited to a cross shaft universal joint that is assembled in a steering apparatus, and can be widely used in cross shaft universal joints that are attached to propeller shafts or various kinds of torque transmitting mechanisms.

EXPLANATION OF REFERENCE NUMBERS

1 Steering wheel
2 Steering shaft
3 Intermediate shaft
4 Steering gear unit
5 Input shaft
6 Universal joint
7a, 7b Yoke
8 Cross shaft
9a, 9b Base section
10, 10a, 10b Joining-arm section
11a, 11b Flange
12 Through hole
13 Through hole
14 Nut
15, 15a, 15b Circular hole
16 Rotating shaft
17a, 17b Shaft section
18, 18a, 18b Cup bearing
19, 19a, 19b Cup
20 Needle
21 Cylindrical section
22, 22a, 22b Bottom section
23 Inward-facing flange section
24 Crimped section
25 Rotating shaft
26 Yoke-clamping jig
27 Supporting-arm section
28 Press-fitting punch
29 Crimping punch
30 Assembly apparatus
31 Press-fitting/crimping device
32 Yoke-clamping jig
33, 33a, 33b Press-fitting punch
34 Supporting-arm section
35 Crimping punch
36 Servo motor

What is claimed is:

1. A method for assembling for a cross shaft universal joint wherein the universal joint comprises: a yoke comprising a pair of joining-arm sections, and a pair of circular holes formed in tip-end sections of the pair of joining-arm sections; a cross shaft comprising a shaft section; and a pair of cup bearings for supporting both end sections of the shaft section on an inside of the pair of circular holes so the shaft may rotate freely; and the pair of cup bearings is assembled in portions between the pair of circular holes of the pair of joining arm sections and the both end sections of the shaft section that is inserted inside the pair of circular holes from an inside-surface side of the pair of joining-arm sections, by press-fitting the cup bearings inside the pair of circular holes from an outside-surface side of the pair of joining-arm sections using a pair of press-fitting punches; wherein the method comprises a step of adjusting an amount of movement of the pair of press-fitting punches according to dimensions of the yoke or cross shaft, or size of elastic deformation of the pair of joining-arm sections during the press-fitting of the pair of cup bearings inside the pair of circular holes, in a state of the pair of joining-arm sections being backed up, and the shaft section being inserted into the pair of circular holes from the inside-surface side of the pair of joining-arm sections, one of the pair of cup bearings is press-fitted to a preset reference position on the inside of one of the pair of circular holes, and at that instant, a value of pressure that is applied to one of the pair of press-fitting punches is set as a reference pressure;

the one of the pair of cup bearings is then further press-fitted from the reference position, and at the instant that the pressure applied to the one press-fitting punch becomes larger than the reference pressure by a preset value, the one of the cup bearings is determined to have reached a position where press-fitting is complete, and the work of press-fitting the one of the pair of cup bearings ends.

2. The method for assembling a cross shaft universal joint according to claim 1, wherein the one of the pair of cup bearings comprises:
a cylindrical shaped cup with a bottom that has a cylindrical section and a bottom section that covers one end side of the cylindrical section; and plural needles that are arranged on the inside of the cup so as to roll freely; and a position in front of the position where an inner surface of the bottom section of the cup comes in contact with a tip-end surface of one of both end sections of the shaft section is set as the reference position.

3. A method for assembling a cross shaft universal joint wherein the universal joint comprises: a yoke comprising a pair of joining-arm sections, and a pair of circular holes formed in tip-end sections of the pair of joining-arm sections; a cross shaft comprising a shaft section; and a pair of cup bearings for supporting both end sections of the shaft section on an inside of the pair of circular holes so the shaft may rotate freely; and the pair of cup bearings is assembled in portions between the pair of circular holes of the pair of joining arm sections and the both end sections of the shaft section that is inserted inside the pair of circular holes from an inside-surface side of the pair of joining-arm sections, by press-fitting the cup bearings inside the pair of circular holes from an outside-surface side of the pair of joining-arm sections using a pair of press-fitting punches; wherein the method comprises a step of adjusting an amount of movement of the pair of press-fitting punches according to dimensions of the yoke or cross shaft, or size of elastic deformation of the pair of joining-arm sections during the press-fitting of the pair of cup bearings inside the pair of circular holes, in a state of the pair of joining-arm sections being backed up, and the shaft section being inserted into the pair of circular holes from the inside-surface side of the pair of joining-arm sections, one of the pair of cup bearings is press-fitted to a preset position where press-fitting is complete using one of the pair of press-fitting punches based on a feed amount of the one of the pair of press-fitting punches, then the one of the pair of press-fitting punches is moved back and the other of the pair of cup bearings is press-fitted to a preset reference position using the other of the pair of press-fitting punches based on a feed amount of the other of the pair of press-fitting punches; and the other of the pair of cup bearings is then pressed together with the shaft section of the cross shaft using the other of the pair of press-fitting punches, and the preset reference position where the size of the pressure that is applied to the other of the pair of press-fitting punches becomes a specified size is determined to be the preset reference position where press-fitting is complete, then press-fitting of the other of the pair of cup bearings is stopped and the other of the pair of press-fitting punches is moved back.

4. The method for assembling a cross shaft universal joint according to claim 3, wherein the value of the pressure that is applied to the other of the pair of press-fitting punches at the instant when the other of the pair of cup bearings has been press-fitted to the reference position is set as a reference pressure, and at the instant when the other of the pair of cup bearings is further press-fitted from the reference position and the pressure that is applied to the other of the pair of press-fitting punches becomes larger than the reference pressure by a preset value, it is determined that the other of the cup bearings has reached the position where press-fitting is complete.

5. The method for assembling a cross shaft universal joint according to claim 3, wherein when further pressing the other of the pair of cup bearings together with the shaft section of the cross shaft from the reference position, the pressure that is applied to the other of the pair of press-fitting punches is monitored, and when an inflection point where the tip-end surface of the other of both end sections of the shaft section begins to come in contact with the inner surface of the bottom section of the other of the pair of cup bearings is detected, the value of the pressure at that inflection point is set as the reference pressure.

6. A method for assembling a cross shaft universal joint wherein the universal joint comprises: a yoke comprising a pair of joining-arm sections, and a pair of circular holes formed in tip-end sections of the pair of joining-arm sections; a cross shaft comprising a shaft section; and a pair of cup bearings for supporting both end sections of the shaft section on an inside of the pair of circular holes so the shaft may rotate freely; and the pair of cup bearings is assembled in portions between the pair of circular holes of the pair of joining arm sections and the both end sections of the shaft section that is inserted inside the pair of circular holes from an inside-surface side of the pair of joining-arm sections, by press-fitting the cup bearings inside the pair of circular holes from an outside-surface side of the pair of joining-arm sections using a pair of press-fitting punches; wherein the method comprises a step of adjusting an amount of movement of the pair of press-fitting punches according to dimensions of the yoke or cross shaft, or size of elastic deformation of the pair of joining-arm sections during the press-fitting of the pair of cup bearings inside the pair of circular holes, when the inside surfaces of the tip-end sections of the pair of joining-arm sections are backed up by a pair of supporting members that moves by being driven by servo motors, the pair of supporting members is moved by being driven by the servo motors in directions parallel to a center axis of the pair of circular holes and in directions away from each other so that the pair of supporting member approach the inside surfaces of the tip-end sections of the pair of joining-arm sections, and at the instant when specified torques occur in the servo motors, the pair of supporting members is stopped and the inside surfaces of the tip-end sections of the pair of joining-arm sections are supported by the pair of supporting members;

next, amounts of shifting from a center position in a direction of the center axis of the circular holes of the pair of supporting members to the center position in the direction of the center axis of the circular holes of the pair of supporting members in a state in which the pair of joining-arm sections are supported are found by using a number of pulses of the servo motors; and when press-fitting the pair of cup bearings using the pair of press-fitting punches, amounts of movement in a forward direction of the pair of press-fitting punches are respectively corrected based on the amounts of shifting.

7. The method for assembling a cross shaft universal joint according to claim 6, further comprising;

a step of using a pair of crimping punches to plastically deform edge sections of the openings of the pair of circular holes of the outside surfaces of the pair of joining-arm sections after press-fitting the pair of cup bearings into the circular holes using the pair of press-fitting punches; wherein when plastically deforming the edge sections of the openings of the pair of circular holes, the amounts of feeding the pair of crimping punches in the forward direction are respectively corrected based on the amounts of shifting.

* * * * *